(12) United States Patent
Bernsmeier et al.

(10) Patent No.: US 11,607,670 B2
(45) Date of Patent: Mar. 21, 2023

(54) METHOD OF PREPARING A MESOPOROUS CARBON COMPOSITE MATERIAL

(71) Applicant: TECHNISCHE UNIVERSITÄT BERLIN, Berlin (DE)

(72) Inventors: Denis Bernsmeier, Berlin (DE); Ralph Krähnert, Berlin (DE); René Sachse, Berlin (DE)

(73) Assignee: TECHNISCHE UNIVERSITÄT BERLIN, Berlin (DE)

( * ) Notice: Subject to any disclaimer, the term of this patent is extended or adjusted under 35 U.S.C. 154(b) by 451 days.

(21) Appl. No.: 16/487,356

(22) PCT Filed: Feb. 20, 2018

(86) PCT No.: PCT/EP2018/054153
§ 371 (c)(1),
(2) Date: Aug. 20, 2019

(87) PCT Pub. No.: WO2018/150047
PCT Pub. Date: Aug. 23, 2018

(65) Prior Publication Data
US 2021/0268481 A1    Sep. 2, 2021

(30) Foreign Application Priority Data

Feb. 20, 2017  (EP) .................... 17156991

(51) Int. Cl.
*B01J 21/18*  (2006.01)
*B01J 23/42*  (2006.01)
(Continued)

(52) U.S. Cl.
CPC .............. *B01J 21/18* (2013.01); *B01J 23/42* (2013.01); *B01J 35/0006* (2013.01);
(Continued)

(58) Field of Classification Search
CPC ........ B01J 21/18; B01J 23/42; B01J 35/0006; B01J 35/0013; B01J 35/0093;
(Continued)

(56) References Cited

U.S. PATENT DOCUMENTS 6,753,290 B1 *   6/2004  Romanenko ............. B01J 21/18
                                                    502/185
7,220,697 B2 *   5/2007  Pak .......................... C01B 32/00
                                                    502/185
(Continued)

FOREIGN PATENT DOCUMENTS

CN       10 4134504       * 11/2014  ............ B82Y 30/00
WO       2012164128 A2    12/2012
WO       WO 2012/164128   * 12/2012  .............. B01J 21/18

OTHER PUBLICATIONS

Zhenhai Wen et al., "Core/Shell Pt/C Nanoparticles Embedded in Mesoporous Carbon as a Methanol-Tolerant Cathode Catalyst in Direct Methanol Fuel Cells." Advanced Materials 20, pp. 743-747. (Year: 2008).*

(Continued)

*Primary Examiner* — Patricia L. Hailey
(74) *Attorney, Agent, or Firm* — Brooks Kushman P.C.

(57) ABSTRACT

A method of preparing a mesoporous carbon composite material having a mesoporous carbon phase and preformed metal nanoparticles located within the mesoporous carbon phase. The present invention also relates to a mesoporous carbon composite material and to a substrate having a film of such mesoporous carbon composite material.

15 Claims, 12 Drawing Sheets

(51) Int. Cl.
*B01J 35/00* (2006.01)
*B01J 35/10* (2006.01)
*B01J 37/02* (2006.01)
*B01J 37/04* (2006.01)
*B01J 37/08* (2006.01)
*B82Y 30/00* (2011.01)
*B82Y 40/00* (2011.01)

(52) U.S. Cl.
CPC ....... *B01J 35/0013* (2013.01); *B01J 35/0093* (2013.01); *B01J 35/1014* (2013.01); *B01J 35/1019* (2013.01); *B01J 35/1023* (2013.01); *B01J 35/1028* (2013.01); *B01J 35/1061* (2013.01); *B01J 37/0225* (2013.01); *B01J 37/04* (2013.01); *B01J 37/08* (2013.01); *B82Y 30/00* (2013.01); *B82Y 40/00* (2013.01)

(58) Field of Classification Search
CPC ................ B01J 35/1014; B01J 35/1019; B01J 35/1023; B01J 35/1028; B01J 35/1061; B01J 37/0225; B01J 37/04; B01J 37/08; B01J 23/06; B01J 23/32; B01J 23/38; B01J 23/48; B82Y 30/00; B82Y 40/00
USPC .................................................. 502/182–185
See application file for complete search history.

(56) References Cited

U.S. PATENT DOCUMENTS

| | | | | |
|---|---|---|---|---|
| 7,875,569 B2* | 1/2011 | Roev | ..................... | B01J 37/0205 |
| | | | | 502/180 |
| 2005/0260118 A1* | 11/2005 | Lu | ....................... | B01D 67/0053 |
| | | | | 423/445 R |
| 2006/0159980 A1* | 7/2006 | Pak | ....................... | H01M 4/926 |
| | | | | 502/159 |
| 2006/0194097 A1* | 8/2006 | Kim | ...................... | H01M 4/926 |
| | | | | 429/506 |
| 2007/0169815 A1* | 7/2007 | Kim | ...................... | H01G 9/2022 |
| | | | | 136/263 |
| 2008/0152577 A1* | 6/2008 | Addiego | ................. | C01B 32/00 |
| | | | | 423/460 |
| 2009/0098442 A1* | 4/2009 | Pak | .......................... | C01B 32/00 |
| | | | | 429/532 |
| 2011/0143254 A1* | 6/2011 | Kongkanand | ....... | H01M 4/8642 |
| | | | | 429/483 |
| 2011/0223494 A1* | 9/2011 | Feaver | .................. | H01M 4/463 |
| | | | | 429/405 |
| 2011/0281027 A1* | 11/2011 | Vogt | ........................ | C23C 18/08 |
| | | | | 427/226 |
| 2014/0107371 A1* | 4/2014 | Bakker | .................. | B01J 23/755 |
| | | | | 558/414 |
| 2014/0170491 A1* | 6/2014 | Chen | ..................... | H01M 4/131 |
| | | | | 429/231.1 |

OTHER PUBLICATIONS

Denis Robert Bernsmeier: "Noble Metal Nanparticles Supported in Ordered Mesoporous Carbon Coatings as Efficient Electrocatalysts for the Hydrogen Evolution Reaction", Apr. 5, 2017, XP055400043, Berlin.

Denis Bernsmeier et al: "Highly Active Binder-Free Catalytic Coatings for Heterogeneous Catalysis and Electrocatalysis: Pd on Mesoporous Carbon and Its Application in Butadiene Hydrogenation and Hydrogen Evolution", ACS Catalysis, vol. 6, No. 12, Nov. 11, 2016, pp. 8255-8263, XP055399986, US ISSN: 2155-5435, DOI:10.1021/acscatal.6b02240 p. 8256-p. 8257, left-hand column, paragraph 1; figure 1.

International Search Report for PCT/EP2018/054153, Prepared by the European Patent Office, dated Apr. 24, 2018.

* cited by examiner

METHOD OF PREPARING A MESOPOROUS CARBON COMPOSITE MATERIAL

CROSS-REFERENCE TO RELATED APPLICATION

This application is the U.S. national phase of PCT Application No. PCT/EP2018/054153 filed on Feb. 20, 2018, which claims priority to EP Patent Application No. 17156991.6 filed on Feb. 20, 2017, the disclosures of which are incorporated in their entirety by reference herein.

The present invention relates to a method of preparing a mesoporous carbon composite material comprising a mesoporous carbon phase and preformed metal nanoparticles located within said mesoporous carbon phase. The present invention also relates to a mesoporous carbon composite material and to a substrate comprising a film of such mesoporous carbon composite material. Furthermore, the present invention relates to the use of a mesoporous carbon composite material according to the present invention.

Combinations of metal nanoparticles and carbon are frequently used catalysts. Typically, these catalysts are generated by impregnating a carbon carrier with an ionic precursor species and by subsequently reducing the precursor. Alternatively, the carbon carrier can also be impregnated with readymade nanoparticles after their synthesis. However, it is then difficult to evenly distribute these particles in the porous system of the carrier. It is also difficult in this approach to achieve a proper pore morphology that matches the size and composition of the particles. In many instances, carbon-based catalysts are generated using binding agents which may block pores and nanoparticles alike.

Bernsmeier et al. (2016) disclose binder-free catalytic coatings for heterogeneous catalysis which are synthesized via co-deposition of a structure-directing agent and small clusters of polymeric carbon precursors along with ionic metal species on a substrate. A sequence of thermal treatments converts the polymer into partly graphitized carbon, decomposes the structure-directing agent and converts the metal precursor into highly active metal nanoparticles. Syntheses and catalytic applications are exemplary demonstrated for palladium on carbon (Pd/OMC).

WO 2012/164128 A2 describes a method for the synthesis of carbon gels doped superficially with metal nanoparticles, based on the formation of macromolecules comprising a phenolic compound, an aldehyde and at least one surfactant. Dissolved metal ions are used as metal precursors.

Accordingly, it was an object of the present invention to provide for an improved and economic way to produce carbon-based catalysts including metal nanoparticles.

This object is solved by a method of preparing a mesoporous carbon composite material comprising a mesoporous carbon phase and preformed metal nanoparticles located within said mesoporous carbon phase, the method comprising the steps:
a) Providing a solution of carbon composite precursors, said solution of carbon composite precursors comprising a structure directing agent capable of forming micelles or lamellar structures, one or several poylmerizable carbon precursor components and a first solvent;
b) inducing said solution of carbon composite precursors to polymerize to form a dispersion of polymer in said first solvent, and separating said polymer from said first solvent;
c) providing preformed stabilized metal nanoparticles;
d) mixing said polymer and said preformed stabilized metal nanoparticles, wherein during said mixing either said polymer or said preformed stabilized metal nanoparticles or both are dispersed in a second solvent;
e) stabilizing the mixture of step d) by subjecting it to a stabilization heat treatment in the range of from 80° C. to 120° C., preferably 90° C. to 110° C., more preferably around 100° C.;
f) subjecting the product of step e) to a carbonization heat treatment in the range of from 500° C. to 1000° C., preferably from 600° C. to 800° C.

In one embodiment, the method additionally comprises a step
applying the mixture resulting from step d) to a substrate to form a polymer film having micelles or lamellar structures and metal nanoparticles within, which step is performed between steps d) and e).

In another embodiment, the method additionally comprises a step
drying the mixture resulting from step d) to yield a solid, which step is performed between steps d) and e).

In one embodiment, said structure directing agent capable of forming micelles or lamellar structures is an amphiphilic molecule, preferably a surfactant, more preferably a surfactant selected from nonionic surfactants, cationic surfactants, anionic surfactants or zwitterionic surfactants ore mixtures thereof.

In one embodiment, said amphiphilic molecule is a surfactant, preferably a nonionic surfactant, more preferably a block copolymer, even more preferably a poloxamer.

In one embodiment, said polymerizable carbon precursor components comprise at least one phenolic compound and, optionally, at least one crosslinkable aldehyde compound, wherein said at least one crosslinkable aldehyde compound is added to said solution during step a) or at the beginning of step b).

In one embodiment, said at least one phenolic compound is selected from phenol, catechol, resorcinol, dihydroqinone, phloroglucinol, cresol, halophenol, aminophenol, hydroxybenzoic acid, and dihydroxybiphenyl.

In one embodiment, said at least one crosslinkable aldehyde compound is selected from formaldehyde, organoaldehydes, and organodialdehydes, represented by formulae HCHO, R—CHO and OHC—R—CHO, respectively, wherein R is a bond, a straight-chained, branched or cyclic hydrocarbonyl group, which can be either saturated or unsaturated, typically containing at least 1, 2, or 3 carbon atoms and up to 4, 5, 6, 7, 8, 9, or 10 carbon atoms, preferably formaldehyde.

In one embodiment, said preformed metal nanoparticles are nanoparticles of one or more metals selected from Sn, Cu, Ag, Au, Zn, Cd, Hg, Cr, Mn, Re, Fe, Ru, Os, Co, Rh, Ir, Ni, Pd, Pt, preferably from Pt, Pd, Ru, Rh, Ir, Os and Ru, more preferably from Pd, Ru, Rh and Ir.

In one embodiment, said preformed stabilized metal nanoparticles do not include carbon nanoparticles, such as carbon blacks, carbon onions, fullerenes, carbon nanodiamonds and carbon nanobuds.

In one embodiment, said preformed stabilized metal nanoparticles have a metallic core of one or several metals selected from Sn, Cu, Ag, Au, Zn, Cd, Hg, Cr, Mn, Re, Fe, Ru, Os, Co, Rh, Ir, Ni, Pd, Pt stabilized by a quaternary ammonium cation or another ionic stabilizing agent.

In a further aspect, the present invention also relates to a mesoporous carbon composite material comprising a mesoporous carbon phase and preformed metal nanoparticles located within said mesoporous carbon phase, wherein said mesoporous carbon phase has pores with an average size in the range of from 2 nm to 50 nm, preferably 2 nm to 10 nm, more preferably 2 nm to 6 nm.

In one embodiment, said mesoporous carbon composite material is prepared b a method according to the present invention.

In one embodiment, said preformed metal nanoparticles are not preformed monometallic Pt-nanoparticles.

In a further aspect, the present invention also relates to substrate comprising a film of mesoporous carbon composite material according to the present invention, said film preferably having a thickness in the range of from 50 nm to 2000 nm, preferably 100 to 1500 nm, more preferably 100 nm to 1000 nm.

In a further aspect, the present invention also relates to the use of a mesoporous carbon composite material according to the present invention or of a substrate according to the present invention, as a catalyst, preferably in heterogeneous catalysis and/or electro catalysis, more preferably as a catalyst in a hydrogen evolution reaction or in fuel cells, or for preparing an electrical capacitor, or for preparing electrodes, catalytic converters, sensors or gas storage devices.

The present inventors have devised a method of preparing a mesoporous carbon composite material including metal nanoparticles in which method preformed metal nanoparticles are mixed with polymer(s) from which the mesoporous carbon phase is to be prepared. According to embodiments of the invention, the polymer(s) is (are) made from a solution of carbon composite precursors which solution comprises a structure directing agent which is capable of forming micelles or lamellar structures such as lamellae, one or several polymerisable carbon precursor components and a suitable first solvent.

The structure directing agent that is capable of forming micelles or lamellar structures, in one embodiment is an amphiphilic molecule, preferably a surfactant. Such surfactant may be an anionic surfactant, a cationic surfactant, a zwitterionic surfactant, a non-ionic surfactant or mixtures of any of the foregoing. Examples of suitable anionic surfactants are alkyl sulfates, alkyl sulfonates, alkyl phosphates and alkyl carboxylates. Specific examples of alkyl sulfates are ammonium lauryl sulfate, sodium lauryl sulfate, and the related alkyl-ether sulfates, such as sodium laureth sulfate and sodium myreth sulfate. Other examples for anionic surfactants are sodium stearate, sodium lauroyl sarcosinate, perfluoro nonanoate and perfluoro octanoate. Examples of cationic surfactants are cetrimonium bromide, cetylpyridinium chloride, benzalconium chloride, benzethonium chloride, dimethyl dioctadecylammonium chloride and dioctadecyldimethylammonium bromide. Examples of zwitterionic surfactants are phospholipids, such as phosphatidylserine, phosphatidylcholine, phosphatidylethanolamine and sphingomyelin. Other examples are (3-[(3-cholamidopropyl)dimethylammonio]-1-propanesulfonate) (CHAPS), cocamidopropylhydroxisultaine and cocamidopropylbetaine. Examples of non-ionic surfactants are polyethylenglycolalkylethers, glucosidealkylethers, polyethylenglycoloctylphenylethers, polyethylenglycolalkylphenylethers, glycerolalkylesters, polyoxyethylenglycolsorbitanalkylesters, block copolymers e.g. of polyethylenglycol and polypropylenglycol, such as poloxamers, and polyethoxylated tallow amine. Suitable block copolymers are for example poly(ethylene oxide)-b-poly(propylene oxide)-b-poly(ethylene oxide) triblock-copolymers (PEO-b-PPO-b-PEO) polystyrene-b-poly(4-vinylpiridine) (PS-b-P4VP) polystyrene-b-poly(ethylene oxide) (PS-b-PEO) also:

Poly(ethylene oxide)-b-poly(butadiene)-b-poly(ethylene oxide) (PEO-b-PB-b-PEO), Poly(propylene oxide)-b-poly(ethylene oxide)-b-poly(propylene oxide) (PPO-PEO-PPO), Poly(ethyleneoxide)-b-poly(isobutylene)-b-poly(ethylenoxide) (PEO-PIB-PEO), Poly(ethylene)-b-poly(ethylene oxide) (PE-PEO), Poly(isobutylene)-b-poly(ethyleneoxide) (PIB-PEO) Poly(ethylen-co-butylen)-b-poly(ethylenoxide) (PEB-PEO), or mixtures of these.

For example, the structure directing agent may be a poloxamer, such as Pluronic F127.

The micelles formed by the structure directing agent may take any shape, e.g. they may be spherical, globular, ellipsoidal or cylindrical. In some embodiments, the structure directing agent may also form structures other than micelles, such as lamellae.

Without wishing to be bound by any theory, the present inventors believe that the presence of a structure directing agent in the solution of carbon composite precursors allows the generation of a structured polymeric phase wherein the micelles and/or lamellar structures generated by the structure directing agent are included in the polymer that is formed from the polymerisable carbon precursor components. These micelles and/or lamellar structures are believed to be acting as templating structures. Because, subsequently, the templating structures (e.g. micelles) are removed, the spaces they leave behind are the pore spaces within the mesoporous carbon phase.

The term "mesoporous", as used herein, is meant to refer to the presence of pores the average diameter of which is in the range of from 2 nm-50 nm, preferably from 2 nm to 20 nm, more preferably from 4 nm to 10 nm.

According to embodiments of the present invention, the solution of carbon composite precursors which solution comprises a structure directing agent, one or several polymerisable carbon precursor components and a suitable first solvent, is induced to polymerize to form a dispersion of polymer in said solvent.

According to embodiments of the present invention, a suitable first solvent is a protic solvent, e.g. a solvent that has one or several of the following qualities: It allows hydrogen bonding, i.e. the formation of hydrogen bonds; there is acidic hydrogen present although a protic solvent may also be a very weak acid; and it is capable of dissolving salts. Typical suitable examples of suitable first solvents in accordance with embodiments of the present invention are lower alcohols such as ethanol, methanol, etc., water and, optionally other acid(s) present (see also further below). Typically, in embodiments of the present invention, the polymerization is performed until clusters of polymer are formed which can be separated from the first solvent by for example centrifugation. Typically, these clusters are of a size and structure such that they are (also) dispersible in the second solvent that is subsequently used in step d). In some embodiments, the time period for which the solution of carbon composite precursors is allowed to polymerize to form a dispersion of polymer in the first solvent is in the range of from 1 minute to 60 minutes, preferably 5 minutes to 30 minutes, more preferably 10 minutes to 20 minutes. In one embodiment, step b) of the method according to the present invention is performed until the polymerizable carbon precursor components form polymer clusters which are of a size to stay dispersible in said second solvent (that is used in step d). In one embodiment, the separation of polymer from the first solvent is done by centrifugation or sedimentation, preferably centrifugation. After the polymer has been separated from the first solvent, in some embodiments, it may optionally be washed, for example with an aqueous solvent, and separated from the washing solution thereafter. In some embodiments, such optional washing and separation step(s) may be repeated once or several times. In one embodiment, the first solvent is selected from water, ethanol, methanol, propanol, and mixtures thereof. Optionally, there is also additionally an acid or base present (see also further below).

In one embodiment, the one or several polymerisable carbon precursor components comprise at least one phenolic compound and, optionally, at least one crosslinkable aldehyde compound, wherein, preferably, said at least one crosslinkable aldehyde compound is added to said solution of carbon composite precursors during step a) or at the beginning of step b).

According to embodiments of the present invention, many phenolic compounds are useful. Examples include phenol, catechol, resorcinol, dihydroquinone, phloroglucinol, cresols, halophenols, aminophenols, hydroxybenzoic acids and dihydroxybiphenyls.

In one embodiment, the solution of carbon composite precursors may initially, during step a), comprise only at least one phenolic compound and said first solvent, whereas said at least one crosslinkable aldehyde compound is subsequently added at the beginning of step b), and polymerization is induced by addition of said at least one crosslinkable aldehyde compound and/or by addition of an acidic component to the solution of carbon composite precursors (see also further below).

In one embodiment, said solution of carbon composite precursors, during step a) only contains a phenolic compound as polymerizable carbon precursor component, an acidic component and said first solvent; and, at the beginning of step b), said at least one aldehyde compound is added to said solution.

In these aforementioned embodiments, the acidic component, if present, may also be replaced by a basic component. Examples of suitable basic components are manifold, including but not limited to alkali hydroxide, such as sodium or potassium hydroxide, or alkali carbonate, such as sodium carbonate.

In some embodiments, the acidic component or basic component may also be absent from the solution of carbon composite precursors. Without wishing to be bound by any theory, the inventors believe that such acidic component or basic component, however, acts as a catalyst and accelerates the polymerization reaction.

In accordance with embodiments of the present invention, the at least one crosslinkable aldehyde compound is selected from formaldehyde, organoaldehydes and organodialdehydes. According to embodiments of the present invention, the organoaldehydes and organodialdehydes are represented by the formulae R—CHO and OHC—R—CHO, respectively, wherein R is a straight-chained, branched or cyclic hydrocarbyl group, which can be either saturated or unsaturated and typically contains at least 1, 2 or 3 carbon atoms and up to 4, 5, 6, 7, 8, 9 or 10 carbon atoms. In addition, with organodialdehyde-compounds, R can also be a bond, in which case, the organodialdehyde-compound is glyoxal. Suitable examples of organoaldehydes include acetaldehyde, propionaldehyde, butyraldehyde, valeraldehyde, hexanal, crotonaldehyde, acrolein, benzaldehyde and furfural. Examples of suitable organodialdehydes include glyoxal, malondialdehyde, succinaldehyde, glutaraldehyde, adipaldehyde, pimelaldehyde, suberaldehyde, sebacaldehyde, cyclopentane dialdehyde, terephthaldehyde and furfuraldehyde.

In some embodiments of the method of the present invention, in the first solvent, there may also be included or added an acidic component (or a basic component) in or to the solution of carbon composite precursors. It may be present already during step a) or be subsequently added during step b). It may be any acid or base that is strong enough to accelerate the polymerization reaction, in particular a reaction between phenolic and aldehyde compounds, e.g. dione compounds. Addition of said acidic or basic component may occur during step a) or step b).

In some embodiments, the acid is a weak acid such as a weak organic acid, e.g. acetic acid, propionic acid or citric acid, or a weak inorganic acid, e.g. phosphoric acid. In other embodiments, the acid is a strong acid, such as a mineral acid, such as hydrochloric acid, hydrobromic acid, hydroiodic acid, sulfuric acid or triflic acid.

The solution of carbon composite precursors, according to embodiments of the present invention is induced to polymerize to form a dispersion of polymer in the first solvent.

According to embodiments of the present invention, in step c), there are provided preformed stabilized metal nanoparticles. In accordance with embodiments of the present invention, such preformed stabilized metal nanoparticles are mixed in step d) with said polymer (generated in step b)). During such mixing, there is a second solvent present, and, preferably, the first solvent is absent. In one embodiment, during the mixing of step d) either said polymer or said preformed stabilized metal nanoparticles or both are dispersed in said second solvent. For example, the dried polymer resulting from step b), i.e. polymer substantially free from said first solvent, may be mixed with said preformed stabilized metal nanoparticles which themselves are dispersed in said second solvent. Alternatively, the polymer resulting from step b) may be re-dispersed in said second solvent and may be mixed with preformed stabilized metal nanoparticles which themselves are in a dried state. Alternatively, both the polymer and the preformed stabilized metal nanoparticles may be dispersed in said second solvent and the two dispersions may be mixed. If the preformed stabilized metal nanoparticles are dispersed in said second solvent, they, preferably, form a colloidal dispersion or suspension. Such preformed stabilized metal nanoparticles, when dispersed in said second solvent, are therefore also sometimes herein referred to as "preformed stabilized colloidal metal nanoparticles" or "stabilized colloidal metal nanoparticles".

In one embodiment, said second solvent is an aprotic organic solvent, preferably with a weak electric dipole moment. In one embodiment, said second solvent is a cyclic ether with 4-6 C-atoms. In a preferred embodiment, said second solvent is tetrahydrofuran (THF).

The term "preformed", as used herein, is meant to refer to the fact, that such nanoparticles are not generated in-situ during a polymerization reaction such as step b) or during a pyrolysis/carbonization step such as step f), but have been generated before, preferably before step d). In accordance with embodiments of the present invention, the colloidal metal nanoparticles are preformed metal nanoparticles which are present in the form of a colloid when they are taken up/contained in said second solvent. Alternatively, the preformed stabilized metal nanoparticles may exist in a dried state.

From such dried state, the preformed stabilized metal nanoparticles may be re-dispersed in a solvent, such as for example the second solvent. Typically, the nanoparticles that are used in accordance with embodiments of the present invention consist of one or several metals selected from Sn, Cu, Ag, Au, Zn, Cd, Hg, Cr, Mn, Re, Fe, Ru, Os, Co, Rh, Ir, Ni, Pd, and Pt. In some embodiments, the present invention also envisages the use of several metals or alloys within such metal nanoparticles. Particularly preferred are combinations of two metals, such as Pt plus Ru or Rh plus Ru. In one embodiment, the metal(s) of these metal nanoparticles is (are) electrochemically noble metal(s). Preferably, the metal(s) of the metal nanoparticles in accordance with embodiments of the present invention have a melting point (melting points) which is (are) higher than the lowest temperature that is used in the carbonization heat treatment step(s). In one embodiment, the melting point(s) of the metal nanoparticles of the present invention is higher than the melting point of Cu. In one embodiment, the melting point of the metal in the metal nanoparticles in accordance with embodiments of the present invention is higher than 600° C. As used herein, the term "nanoparticle" is herein also sometimes abbreviated as "NP". For example, a platinum nanoparticle may be abbreviated as PtNP. A nanoparticle of a combination of platinum and ruthenium is herein also sometimes abbreviated as PtRuNP. An unspecified metal nanoparticle in accordance with the present invention may also herein also sometimes be referred to as "MeNP".

In one embodiment, the metal nanoparticle is not a monometallic Pt metal nanoparticle. The term nanoparticle, as used herein, is meant to refer to a particle, the average size of which is in the range of from 1 nm to 20 nm. In preformed colloidal metal nanoparticles according to the present invention, there is a protective shell of an ionic stabilizing agent surrounding the metal nanoparticle, which protective shell allows the dispersion/solution of the metal nanoparticle within a solvent.

In an embodiment of the present invention, the ionic stabilizing agent is a quaternary ammonium cation, for example a quaternary alkyl ammonium cation or quaternary aryl ammonium cation. An example of such suitable quaternary ammonium cation is the tetraoctyl ammonium cation, as for example in the compound tetraoctyl ammonium triethylhydroburate.

Preformed stabilized metal nanoparticles according to the present invention may be prepared in accordance with methods known to a person skilled in the art, as for example disclosed in U.S. Pat. No. 6,531,304 or 5,580,492. According to this example, such stabilized metal nanoparticles are prepared by reacting metal salts, halides, pseudo halides, alcoholates, carboxylates or acetyl acetonates of metals of the Periodic Table groups 6-11 with protolyzable organo metallic compounds. Alternatively, colloids of transition metals of Periodic Table groups 6-11, synthesized by other methods, e.g. precious-metal anticorrosion-protected colloids of Fe, Co, Ni or their alloys may be reacted with organo metallic compounds. The protective shell of the thus prepared colloidal starting materials contains reactive metal-carbon bonds which can react with modifying compounds, such as alcohols, carboxylic acids, polymers, polyethers, polyalcohols, polysaccharides, sugars, surfactants, silanols, active charcoals, inorganic oxides or hydroxides. Examples of such modifying compounds are 1-decanol, 2-hydroxypropionic acid, cis-9-octadecenoic acid, triphenylsilanol, glucose, polyethylenglycol, polyvinylpyrolidone, and various surfactants, such as cationic, anionic, amphiphilic or non-ionic surfactants, e.g. di(hydrotallow)dimethylammoniumchloride, lauryldimethylcarboxymethylammoniumbetaine, Na-cocoamidoethyl-N-hydroxyethylglycinate, decaethyleneglycolhexadecylether, polyethyleneglycoldodecylether, polyoxyethylene sorbitane monolaurate.

Another way of preparing preformed stabilized metal nanoparticles according to the present invention occurs by reducing a salt of a metal selected from Sn, Cu, Ag, Au, Zn, Cd, Hg, Cr, Mn, Re, Fe, Ru, Os, Co, Rh, Ir, Ni, Pd, and Pt and combinations thereof, in the presence of tetraalkyl ammonium triorgano hydroborates, for example tetraoctyl ammonium triethylhydroborate, tetrabutyl ammonium triethylhydroborate or, more generally tetra(alkyl) ammonium triethylhydroborate, wherein alkyl=C1-C10-alkyl, preferably C4-C8-alkyl.

In one embodiment, the ionic stabilizing agent is a quaternary alkyl ammonium cation or a quaternary alkyl phosphonium cation, the alkyl having 4-10 carbon atoms in the chain. Without wishing to be bound by any theory, the present inventors believe that a stabilization is achieved by these agents through electrostatic and/or steric interaction.

In accordance with embodiments of the present invention, after the polymer and the preformed stabilized metal nanoparticles have been mixed, such mixture is subjected to a stabilization heat treatment. Typically, such stabilization heat treatment involves exposing the mixture to a temperature in the range of from 80° C. to 120° C., preferably from 90° C. to 110° C., more preferably to a temperature around 100° C., e.g. 99° C. to 101° C. The purpose of this stabilization heat treatment step is to increase the degree of crosslinking in the polymer. Typically, such stabilization heat treatment step is performed for a period of time from one minute to 24 hours, preferably from 20 minutes to 12 hours, preferably from 60 minutes to 5 hours.

After the stabilization heat treatment, the resultant product is subjected to a carbonization heat treatment step. Such carbonization heat treatment step is performed to convert the polymer(s) previously induced and the structure directing agent(s) capable of forming micelles, as well as the micelles or lamellar structures, into carbon. Such carbonization heat treatment typically involves the exposure of the material to be carbonized to a temperature above 400° C., and such carbonization heat treatment occurs preferably in the presence of an inert atmosphere which is substantially free of and without any oxygen. Possible inert atmospheres in which such carbonization heat treatment may be performed include inert gases such as $N_2$ and noble gases, but also CO, $CO_2$, $H_2$, $CH_4$ and combinations thereof. In one embodiment, such inert atmosphere for the carbonization heat treatment is a mixture of an inert gas, such as argon, supplemented with a slightly reducing additive, such as $H_2$ and/or CO, $NH_3$, or $CH_4$. In one embodiment, the inert atmosphere is an argon atmosphere with 2-6% $H_2$, preferably approximately 4% $H_2$. In one embodiment, any of the aforementioned inert atmospheres may also be used in one or several of the preceding steps, such as step d) and/or in step e). In one embodiment, the temperature range at which the carbonization heat treatment step occurs is in the range of from 400° C. to 1500° C., preferably from 600° C. to 800° C.

The carbonization heat treatment step is preferably performed for a time period in the range of from 5 minutes to 240 minutes, preferably from 20 minutes to 180 minutes.

It should also be noted that, in accordance with embodiments of the present invention, the mixture resulting from step d) may be applied to a substrate to form a polymer film having stabilized metal nanoparticles and micelles/lamellar structures within, and such step is performed between steps d) and e). In another embodiment, the mixture resulting from step d) may also be dried to yield a solid. Again, such drying step is performed between steps d) and e). Such drying may occur in various forms, for example by spray drying or freeze drying or simply drying in air.

Without wishing to be bound by any theory, the present inventors believe that by the carbonization heat treatment step, the porous or cavernous structure that is generated in the polymer by the formed micelles, due to the presence of such micelles within the polymer, is converted into a porous structure within the polymer with void spaces, i.e. porous in which the preformed metal nanoparticles remain. Typical carbonization heat treatment periods are in the range of from 5 minutes to 240 minutes, preferably 20 minutes to 180 minutes.

It should also be noted that, in one embodiment, after the solution of carbon composite precursors has been induced to polymerize to form a dispersion of polymer in the first solvent, and after the polymer has been separated from said first solvent, such resultant polymer may be dried, e.g. freeze-dried, for storage, and may subsequently be taken up in a suitable solvent again, e.g. the second solvent, for further manipulation.

In embodiments of the present invention, during step d) said polymer and said preformed stabilized metal nanoparticles are mixed, wherein such step d) occurs in the presence of said second solvent and in the absence of said first solvent. It should be noted that said first solvent and said second solvent are different. Hence, in preferred embodiments, for the performance of step d) either said polymer or said preformed stabilized metal nanoparticles or both are provided in dispersed form in said second solvent. Hence, as an example, said polymer may be provided in a dried form and said preformed stabilized metal nanoparticles may be provided in a dispersed form in said second solvent, and may then be mixed. Alternatively, said polymer may be provided in dispersed form in said second solvent and said preformed stabilized metal nanoparticles may be provided in dried form, and these may then be subsequently mixed. In yet a further embodiment, both said polymer and said preformed stabilized metal nanoparticles may be provided in dispersed form in said second solvent and may subsequently be mixed. In any case, during step d), there is no longer said first solvent present.

In one embodiment, said second solvent is an aprotic solvent, preferably an aprotic organic solvent with a weak electric dipole moment. In preferred embodiments, said second solvent is a cyclic either, preferably with 4-6 C-atoms in the ring. A particularly suitable example for said second solvent is tetrahydrofuran (THF).

In one embodiment, the mixture of polymer and of preformed stabilized metal nanoparticles is applied on a substrate, to form a film thereon, which is then subsequently subjected to stabilization heat treatment and carbonization heat treatment. In other embodiments, the mixture of polymer and of preformed stabilized metal nanoparticles is dried, e.g. spray dried, to yield a powder/solid substance that is subsequently subjected to stabilization heat treatment and carbonization heat treatment. In either case, the resultant mesoporous carbon composite material is electrically conductive and may be used as catalysts, either in the form of a film on a substrate or as a powder. Examples of such catalysis are heterogeneous catalysis or electrocatalysis. One particular example where the mesoporous carbon composite materials according to the present invention may be used is the hydrogen evolution reaction (HER), one of the partial reactions in the electrolysis of water. Moreover, the mesoporous carbon composite material according to the present invention may also be used as an electrical capacitor.

In accordance with embodiments of the present invention, the preformed metal nanoparticles which are located within the mesoporous carbon phase of the mesoporous carbon composite material are metal nanoparticles of one or several of the following metals: Sn, Cu, Ag, Au, Zn, Cd, Hg, Cr, Mn, Re, Fe, Ru, Os, Co, Rh, Ir, Ni, Pd, and Pt. Examples of metal nanoparticles which comprise more than one metal are nanoparticles comprising an alloy or combination of Fe and Co, of Pt and Cu, of Pt and Ru, of Pt, Rh, of Pt and Pd, and of Rh and Ru.

In accordance with embodiments of the present invention, the mesoporous carbon composite materials prepared by the method according to the present invention are herein also sometimes referred to as ordered mesoporous carbon (OMC) with preformed stabilized metal nanoparticles therein. As an example, "PdNP/OMC" refers to an ordered mesoporous carbon (composite) in which palladium nanoparticles are distributed. Generally speaking, the composites in accordance with the present invention may also be referred to as "MeNP/OMC". When the composites in accordance with the present invention are prepared as a film, such film shows a high degree of pore ordering, is crack-free and shows a homogenous film thickness. The application of such films may occur by any suitable method, such as spray coating, dip coating, doctor blading, Langmuir-Blodgett-techniques, casting, in particular drop casting, spin coating, bar coating, and other comparable techniques.

Within the composites in accordance with the present invention, the nanoparticles retain their size, are well distributed inside the mesoporous carbon matrix and thus allow for a high accessibility of the respective metal species. Physisorption measurements show a high surface area and porosity of the composites in accordance with the present invention. The composites exhibits a high degree of micro- and mesoporosity. An evaluation/analysis based on the non-local density functional theory (NLDFT) model shows an abundant presence of template mesopores with a pore diameter of approximately 5 nm. The composites in accordance with the present invention have a high degree of pore ordering, with a d-spacing of the (110) plain of approximately 7.6 nm, indicating a strong film shrinkage in direction of the film's normal of approximately 50% during template removal and carbonization. Electrochemical characterizations show that the composites in accordance with the present invention have an outstanding catalytic activity, for example in the hydrogen evolution reaction (HER). The composites in accordance with the present invention may be used as catalysts, preferably in heterogeneous catalysis and/or electrocatalysis. As an example, they may be used as a catalyst in a hydrogen evolution reaction (HER) during the electrolysis of water, or they may be used as catalyst in fuel cells, for example in proton exchange membrane fuel cells (PEMFC), in the hydrogen oxidation reaction (HOR) and/or in the oxygen reduction reaction (ORR). For example bimetallic composites according to the present invention, e.g. Ru Pt-based composites according to the present invention are particularly good for such purposes. In embodiments of the present invention, the composites may also be used as electrodes, catalytic converters, sensors, capacitors or gas storage devices.

BRIEF DESCRIPTION OF DRAWINGS

More specifically, FIG. 1 shows the preparation of PdNP/OMC, using a poloxamer as structure directing agent, resorcinol as phenolic compound and formaldehyde as crosslinkable aldehyde compound.

FIG. 2 shows an embodiment of the employed synthesis procedure for ordered mesoporous carbon films with incorporated preformed Rh nanoparticles. To synthesize the reducing agent tetraoctylammonium triethylhydroborate ($N(octyl)_4BEt_3H$), tetraoctyle ammoniumbromide is dissolved in THF and potassium triethylhydroborate in THF is added under inert atmosphere. The mixture is cooled down to 0° C. After 20 hours KBr is separated as a white precipitate by filtration and washed. $RhCl_3$ as metal precursor is dissolved in THF. While stirred, the freshly prepared $N(octyl)_4BEt_3H$ solution is added to the dissolved metal precursor. After 24 hours the stabilized colloidal nanoparticles can be employed.

For the synthesis of the polymer precursor, resorcinol and the pore template Pluronic F127 were dissolved in EtOH until a clear solution was obtained. Then 3 M HCl was added and the tube was shaken for 30 minutes. Thereafter formaldehyde solution (37% in water) was added with continued shaking. Ten minutes after addition of formaldehyde a white precipitate was separated via centrifugation and the remaining solution discarded. The white precipitate was washed with water and centrifuged again two times. The obtained polymer/template phase was subsequently freeze dried for 12 h to remove all volatile components.

For the RhNP/OMC film synthesis the freeze-dried polymer precursor was dissolved in THF under Ar atmosphere and shaken for 10 min. RhNP colloid in THF was added. The mixture was shaken for another 10 min. The resulting homogeneous black suspension was employed for film casting. Catalyst films were deposited via dip-coating at room temperature in Ar atmosphere inside a glove-box. The coated substrates were transferred to a drying furnace and then treated for 12 h at 100° C. in air for film stabilization. The stabilized films were transferred into a tube furnace and heated with 3 K/min in $H_2$/Ar (4 vol % $H_2$) flow to 700° C., holding this temperature for 3 h. The films were naturally cooled down to room temperature in $H_2$/Ar flow.

Figure 1:
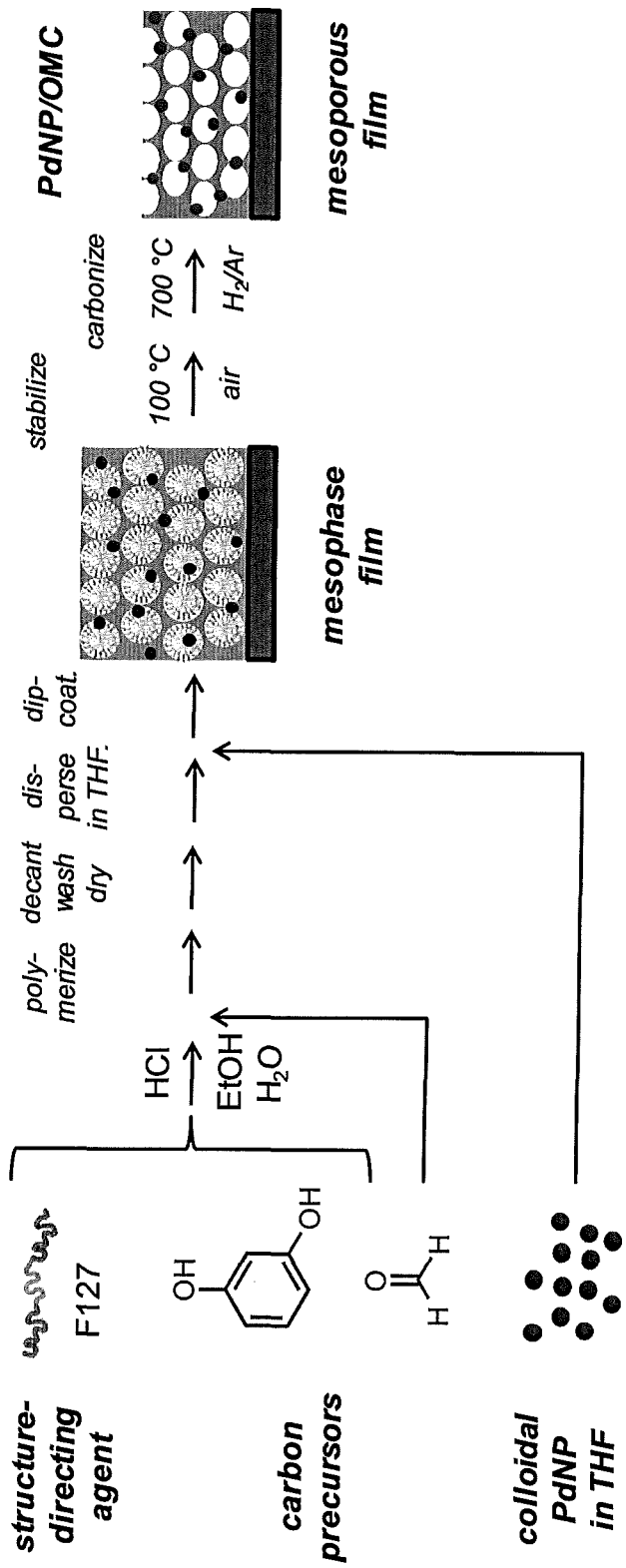
FIG. 1 shows an embodiment of a method in accordance with the present invention. More specifically, in this example, a solution of carbon composite precursors comprises a poloxamer, e.g. Pluronic® F127, as a structure directing agent that is capable of forming micelles, resorcinol as phenolic compound and formaldehyde as crosslinkable aldehyde compound. The preformed colloidal metal nanoparticles are colloidal PdNP (i.e. palladium nanoparticles) in THF.
Figure 2:
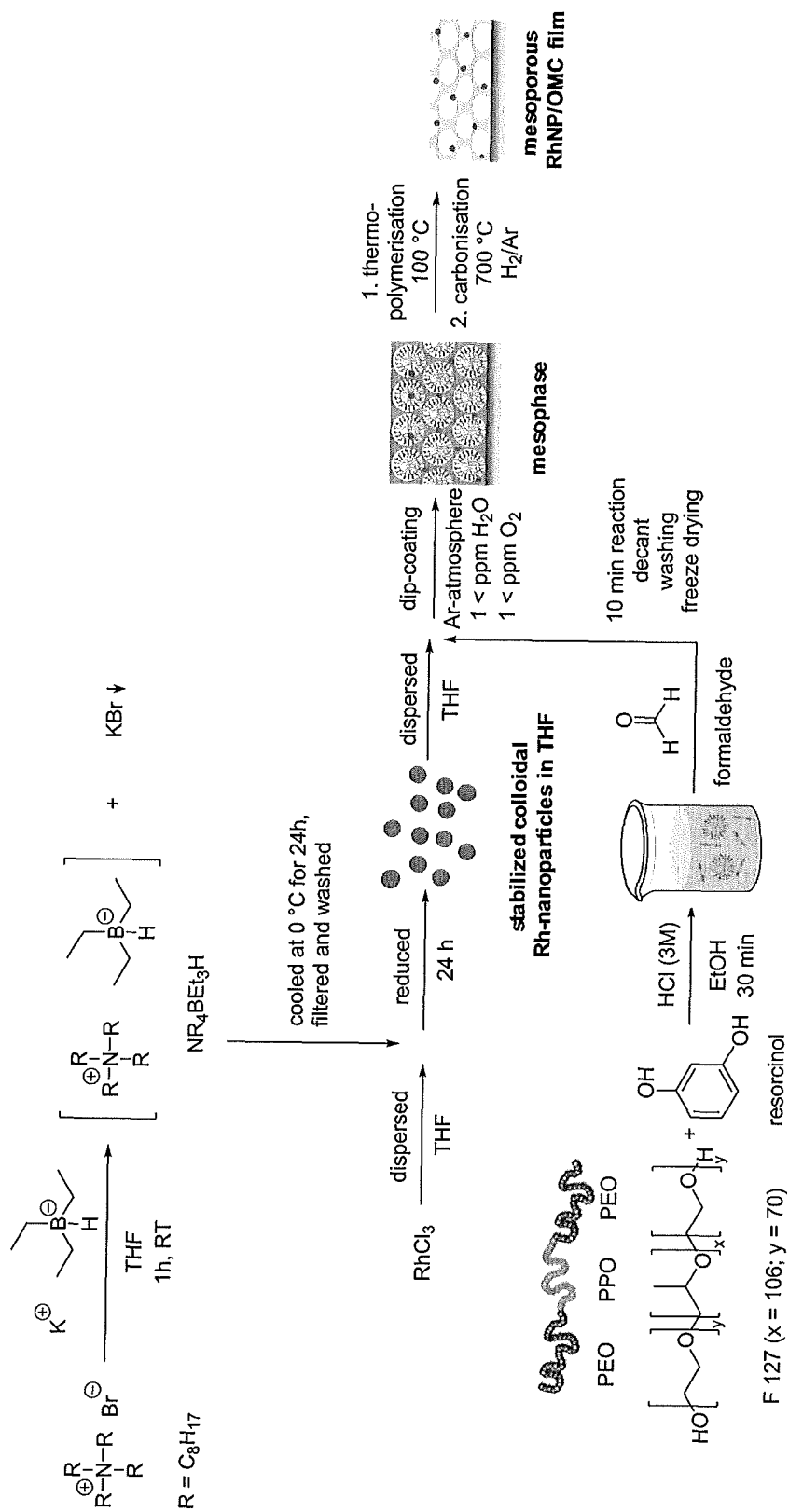
FIG. 2 shows an embodiment of a method in accordance with the present invention, namely the synthesis procedure for ordered mesoporous carbon films with incorporated preformed Rh nanoparticles.
Figure 3:
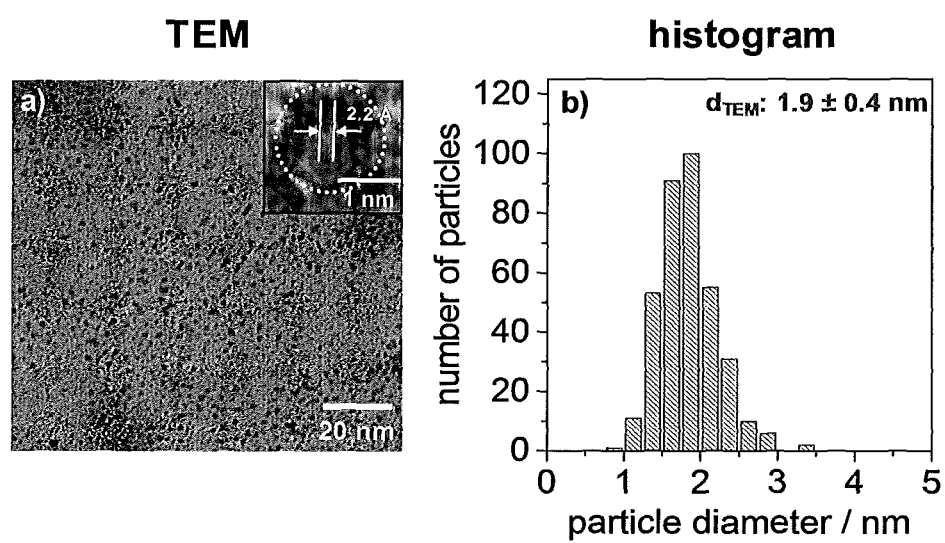
FIG. 3 shows a transmission electron microscopic (TEM) analysis of rhodium nanoparticles deposited onto a carbon coated Cu grid.

FIG. 3 shows the transmission electron microscopic (TEM) analysis of rhodium nanoparticles deposited onto a carbon coated Cu grid. a) TEM micrograph, together with an TEM image in high resolution of one particle (inset). The determined distance of 2.2 Å can be assigned to the (111) lattice plane distance of cubic rhodium (PDF: 01-087-0714). b) The diameter of 360 particles was determined and plotted in a histogram. The mean diameter amounts to 1.9±0.4 nm. Small, monodisperse and stable nanoparticles can be synthesized.

Figure 4:
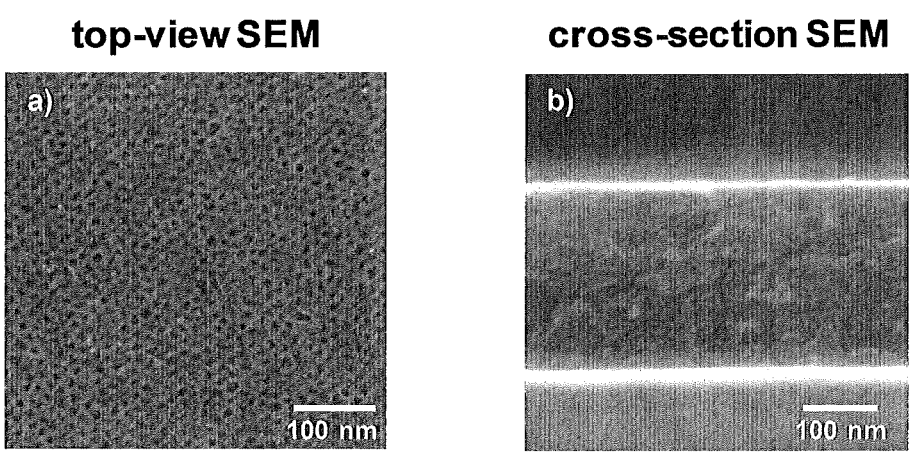
FIG. 4 shows the scanning electron microscopic (SEM) analysis of an ordered mesoporous carbon film with incorporated rhodium nanoparticles after carbonization at 700° C. in $H_2$/Ar.

FIG. 4 shows the scanning electron microscopic (SEM) analysis of an ordered mesoporous carbon film with incorporated rhodium nanoparticles after carbonization at 700° C. in $H_2$/Ar. a) Top-view SEM image. The darker round areas correspond to templated mesopores and the small lighter spots can be attributed to Rh nanoparticles. b) Cross-section SEM image of film with a film thickness of ca. 265 nm.

The films show a high degree of pore ordering. The films are crack-free and show a homogeneous film thickness.

Figure 5:
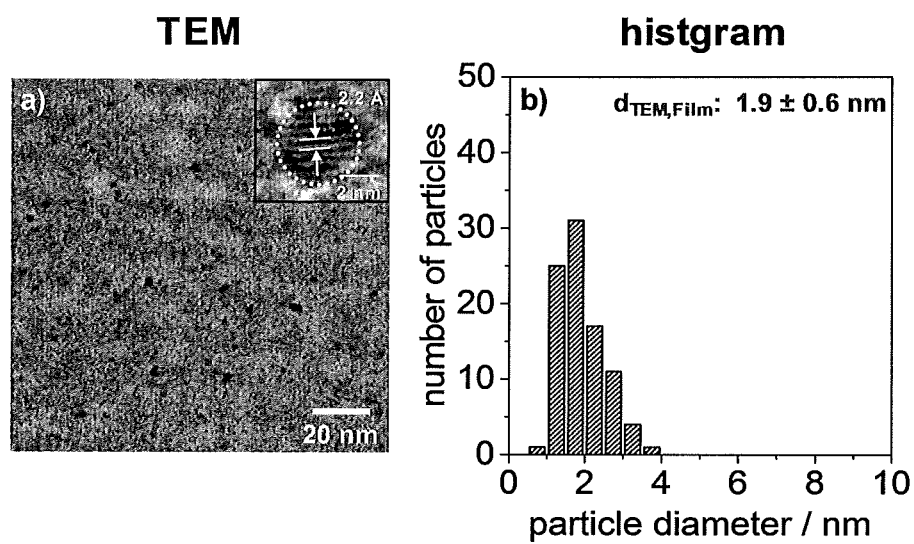
FIG. 5 shows the transmission electron microscopic (TEM) analysis of an ordered mesoporous carbon film with incorporated rhodium nanoparticles after carbonization at 700° C. in $H_2$/Ar.

FIG. 5 shows the transmission electron microscopic (TEM) analysis an ordered mesoporous carbon film with incorporated rhodium nanoparticles after carbonization at 700° C. in $H_2$/Ar. a) TEM micrograph, together with an TEM image in high resolution of one particle (inset). The determined distance of 2.2 Å can be assigned to the (111) lattice plane distance of cubic rhodium (PDF: 01-087-0714). b) The diameter of 90 particles was determined and plotted in a histogram. The mean diameter amounts to 1.9±0.6 nm.

After carbonization the nanoparticles retain their small size. The particles are well distributed inside the mesoporous carbon matrix ensuring a high accessibility of the metal species.

Figure 6:
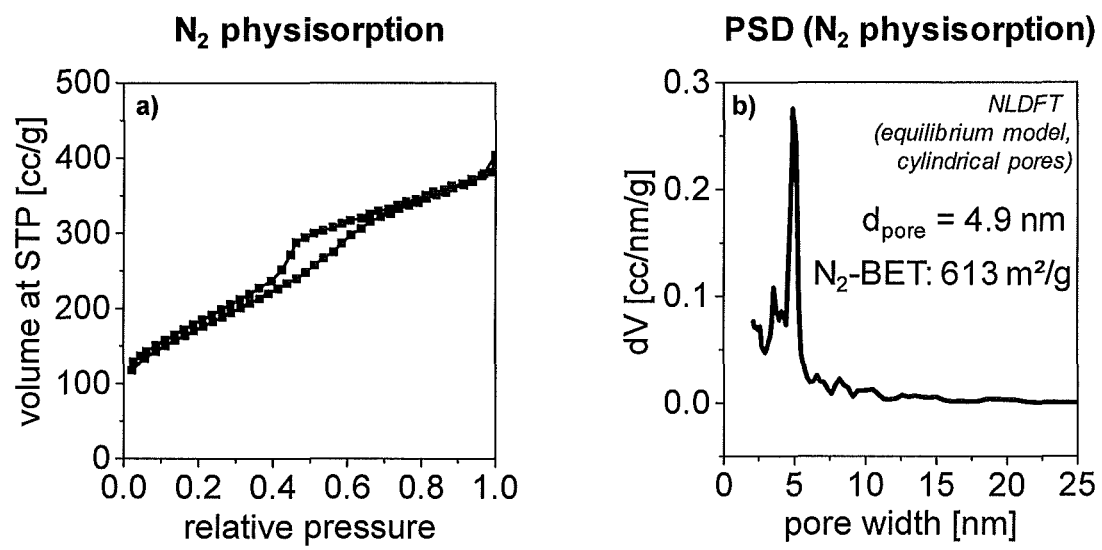
FIG. 6 shows a characterization by physisorption of a PtNP/OMC powder, carbonized at 700° C.

FIG. 6 shows the characterization by physisorption of a PtNP/OMC powder, carbonized at 700° C.: a) isotherm of a $N_2$ physisorption measurement at 77K. b) NLDFT evaluation of the isotherm (a) with assumption of a cylindrical pore configuration. The specific surface area from BET evaluation amounts to 613 $m^2$/g.

Physisorption measurements show a high surface area and porosity of the MeNP/OMC materials. The materials exhibit a high degree of micro- and mesoporosity. NLDFT evaluation proves the abundant presence of templated mesopores with a pore diameter of ca. 5 nm.

Figure 7:
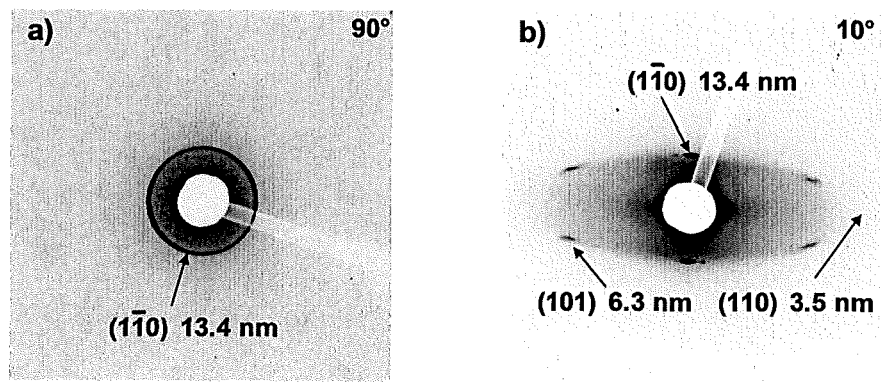
FIG. 7 shows a small angle X-ray scattering (SAXS) characterization of a RuPtNP/OMC film, carbonization at 700° C. in $H_2$/Ar.

FIG. 7 shows the small angle X-ray scattering (SAXS) characterization of a RuPtNP/OMC film, carbonized at 700° C. in $H_2$/Ar: 2D-SAXS pattern recorded in transmission mode with an incident angles of 90° (a) and 10° (b). a) The pattern shows an isotropic ring which can be attributed to a d-spacing value of 13.4 nm for the (1$\bar{1}$0) plane of a mesopore lattice. b) The SAXS measurement in a tilted angle shows diffraction spots on an ellipsoidal ring. The scattering spots can be assigned to the (101) and (1$\bar{1}$0) lattice planes of a contracted cubic pore system SAXS analysis proves a high degree of pore ordering. The d-spacing of the (110) plane amounts to 7.6 nm, indicating a film strong film shrinkage in direction of the film's normal of ca. 50% during template removal and carbonization.

Figure 8:
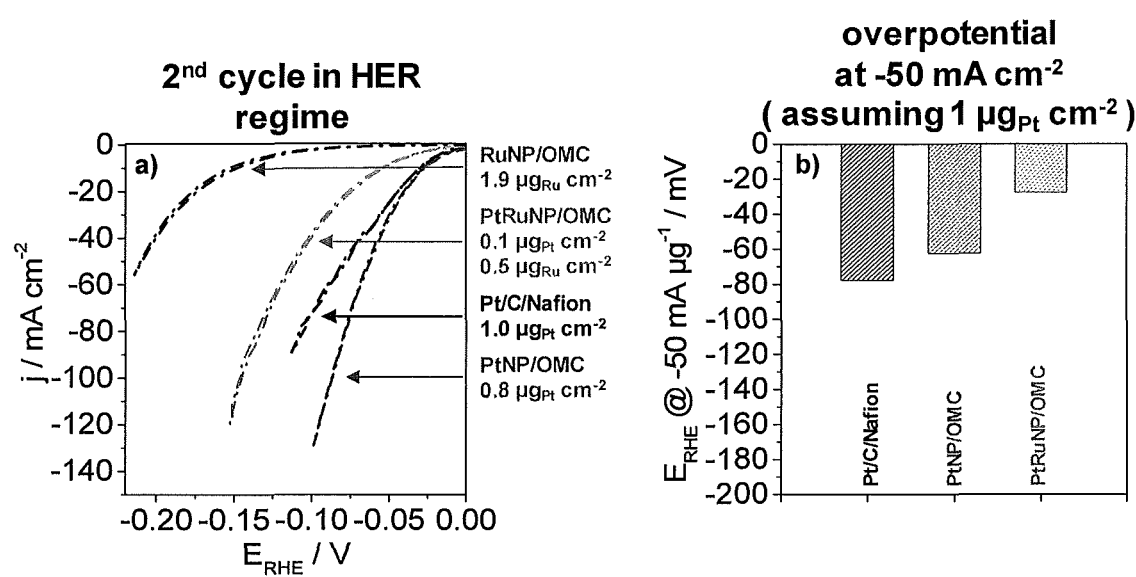
FIG. 8 shows an electrochemical characterization of a F127-templated MeNP/OMC film.

FIG. 8 shows the electrochemical characterization of a F127-templated MeNP/OMC films. The electrocatalytic activity was studied by cyclic voltammetry in 0.5 M $H_2SO_4$.
a) $2^{nd}$ cycle of cyclic voltammetry of MeNP/OMC catalyst films and a commercial Pt/C/Nafion reference catalyst. f) The observed overpotential at $-50$ mA $\mu g_{Pt}^{-1}$.

Electrocatalytic performance studies of bimetallic PtRuNP/OMC catalysts in the HER regime reveal a high activity at low Pt loadings. FIG. 8b shows that a RuPtNP/OMC catalyst reaches a mass-based current density of $-50$ mA $\mu g_{Pt}^{-1}$ at an overpotential of $-28$ mV. A monometallic PtNP/OMC catalyst needs an overpotential which is about two times higher to reach the same performance. A commercial Pt/Vulcan reference catalyst needs an overpotential which is three times higher.

Figure 9:
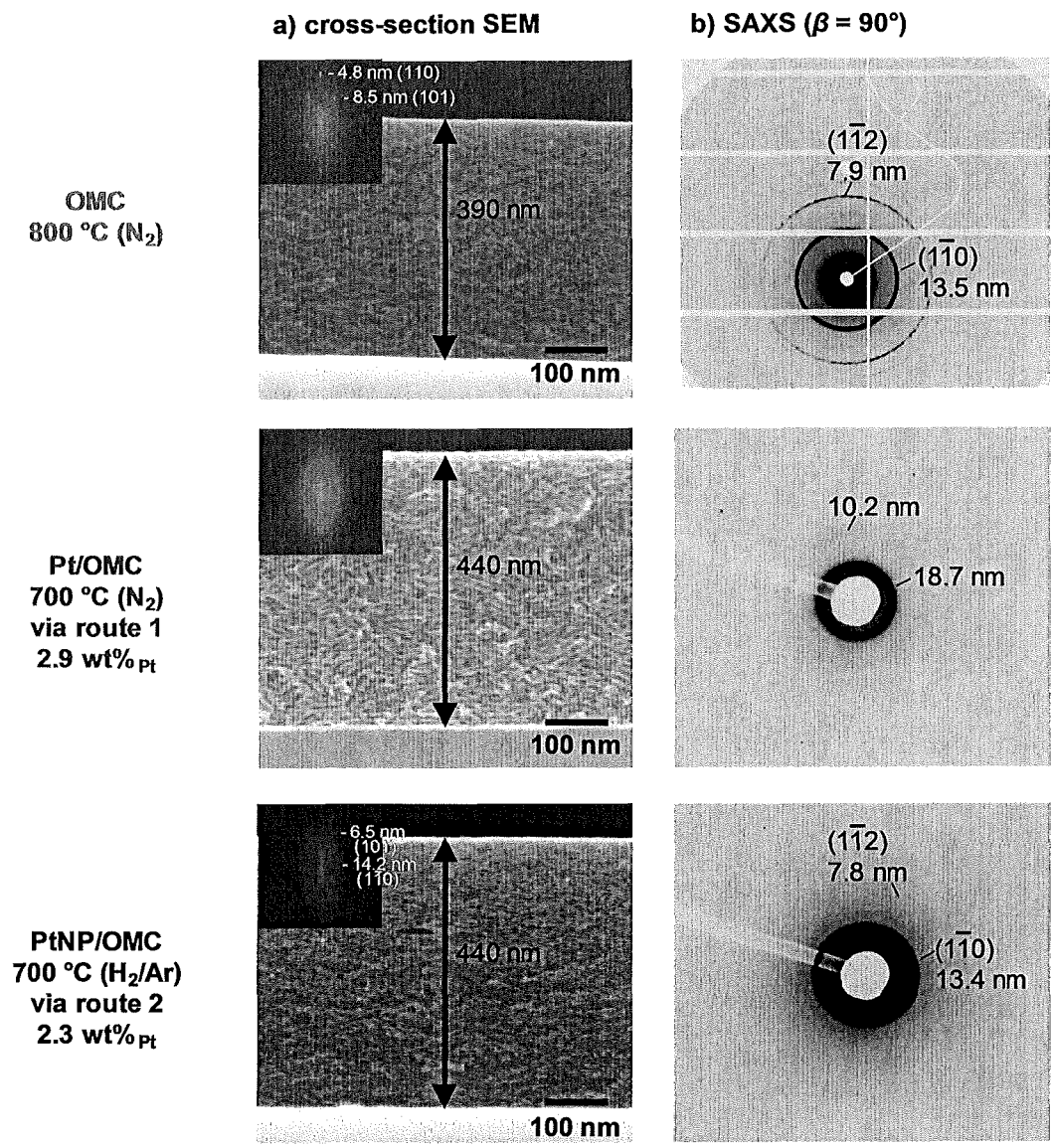
FIG. 9 shows SEM and SAXS analyses of an OMC, a Pt/OMC and a PtNP/OMC film.

FIG. 9 shows SEM and SAXS analyses of an OMC, a Pt/OMC (route 1) and a PtNP/OMC (route 2) film, as described in Example 8. F127 was used as templating agent and the films were carbonized for 3 h under the given conditions.
 a) Cross-section SEM images with FFT insets,
 b) SAXS patterns with incident angles of β=90°. The isotropic rings in (b) can be attributed to regular pore lattice distances.

Figure 10:
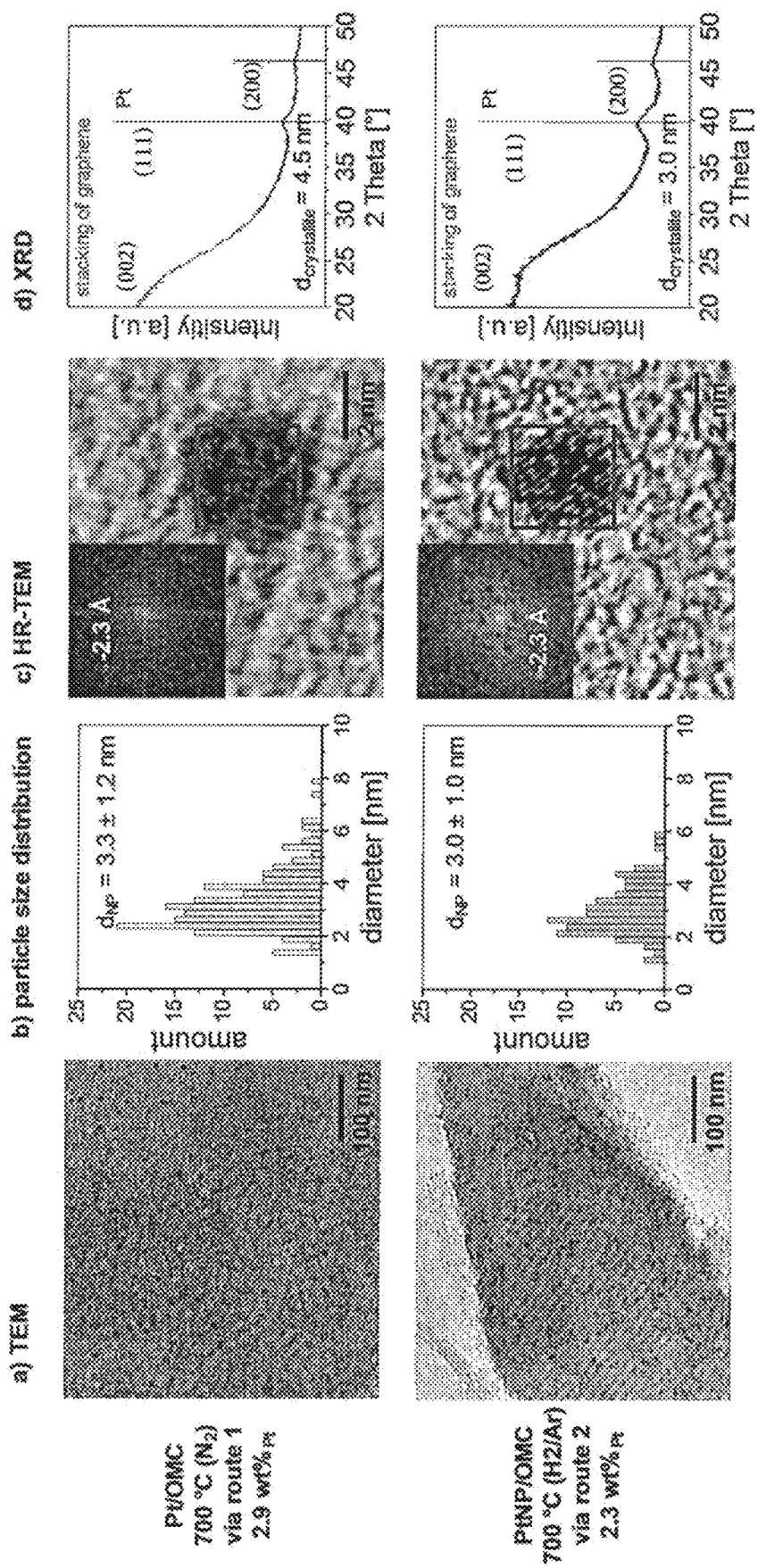
FIG. 10 shows SEM and SAXS analyses of an OMC, a Pt/OMC and a PtNP/OMC film.

FIG. 10 shows TEM, HR-TEM and XRD analyses of a Pt/OMC (route 1) and a PtNP/OMC (route 2) film. F127 was used as templating agent and the films were carbonized at 700° C. in the given atmosphere.
 a) TEM micrograph of a scraped off film segment,
 b) particle size distribution of Pt nanoparticles determined by TEM,
 c) HR-TEM of a Pt particle with corresponding FFT inset and d) XRD pattern, indicated reflections of cubic Pt (04-0802) and Rietveld refinement.

Figure 11:
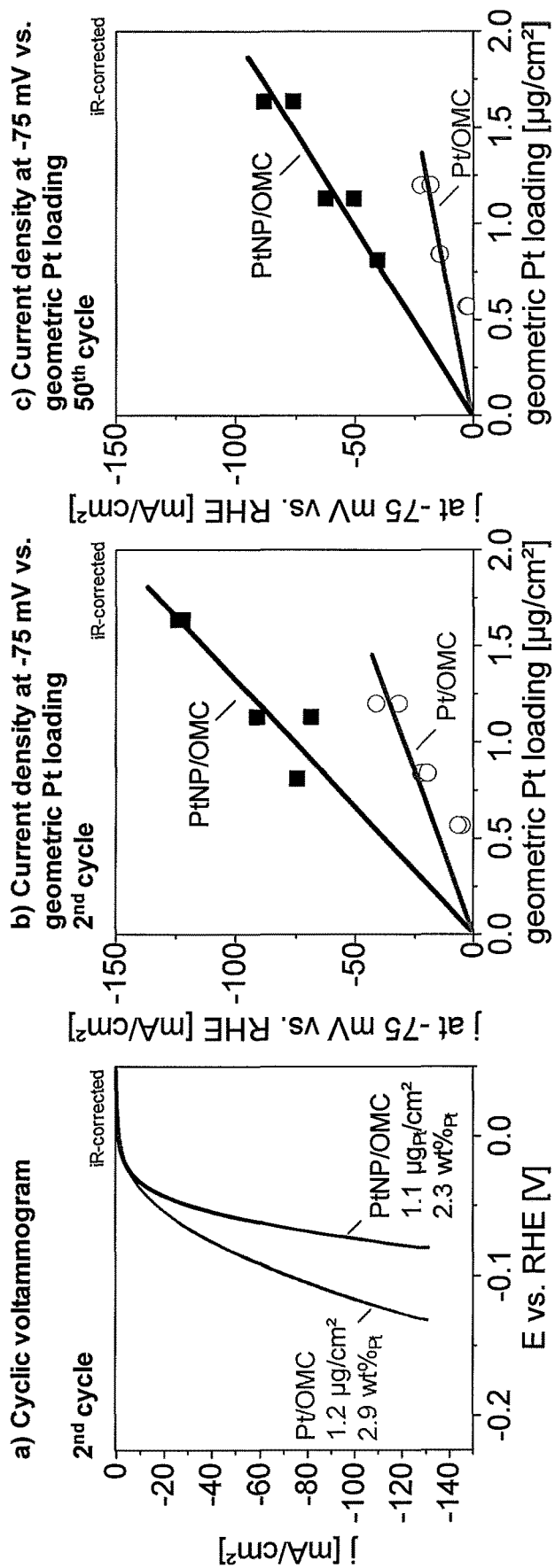
FIG. 11 shows the electrocatalytic performance of F127-templated Pt-containing catalyst films in 0.5 M sulfuric acid.

FIG. 11 shows electrocatalytic performances of F127-templated Pt-containing catalyst films in 0.5 M sulfuric acid. All films were carbonized at 700° C. for 3 h. Pt/OMC was carbonized in $N_2$ and PtNP/OMC in $H_2$/Ar.
 a) $2^{nd}$ cycles of Pt/OMC (route 1) catalysts with Pt loading of 1.2 μg/cm² compared to a PtNP/OMC catalyst (route 2) with 1.1 μg/cm².
 b) and c) Current density at a potential of $-75$ mV vs. RHE at the $2^{nd}$ (b) and $50^{th}$ (c) cycle plotted against the geometric Pt loading of Pt/OMC and PtNP/OMC catalysts. Each point represents one measured catalyst. The mass loading was determined by WDX and StrataGem software.

Figure 12:
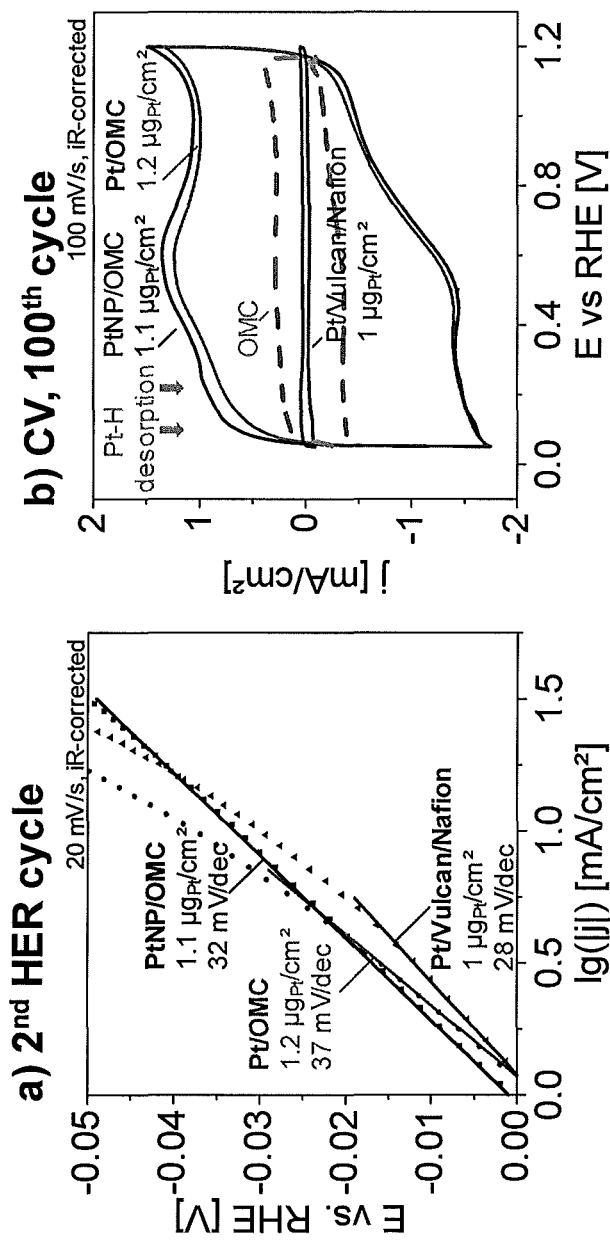
FIG. 12 shows the electrocatalytic evaluation of Pt-containing catalyst films in 0.5 M sulfuric acid.

FIG. 12 shows an electrocatalytic evaluation of Pt-containing catalyst films in 0.5 M sulfuric acid. A Pt/OMC (route 1) catalyst with a Pt loading of 1.2 μg/cm², a PtNP/OMC (route 2) catalyst with 1.1 $\mu g_{Pt}$/OMC catalyst and a Pt/Vulcan/Nafion reference catalyst with 1.0 $\mu g_{Pt}$/cm² are compared. Tafel evaluation (potential E vs. log(current density) of the $2^{nd}$ cycle (a) of a cyclic voltammetry measurement recorded in the HER regime with 20 mV/s. b) CV measurements recorded between 50 and 1200 mV: PtNP/OMC (700° C., $H_2$/Ar), Pt/OMC (700° C., $N_2$) and Pt/Vulcan/Nafion are compared to OMC film without Pt (800° C., $N_2$) with a film thickness of 390 nm.

Furthermore, reference is made to the following examples which are given to illustrate, not to limit the present invention.

EXAMPLES

Example 1—Preparation of Colloidal Metal Nanoparticles (RhNP)

The reducing agent Tetraoctylammoniumtriethylhydroborate $(N(C_8H_{17})_4B(C_2H_5)_3)$ H was synthesized under Ar atmosphere ($O_2$<1 ppm; $H_2O$<1 ppm) in a glovebox. 547 mg of TOAB was initially dissolved in 1.2 ml THF. During stirring 1.0 ml of $KBEt_3H$ solution was added and a white precipitation formed. The mixture was stirred for 1 h and kept tightly sealed in a freezer (ca. 0° C.) for 20 hours. Thereafter the mixture was brought to room temperature in the glovebox and a white precipitate of KBr was removed by filtration (syringe filter, 5.0 PTFE) and washed with 0.55 ml THF. The filtrate and washing solution was filtrated again (syringe filter, 0.2 μm, Nylon) and a colorless solution was obtained.

The RhNP colloid synthesis was performed under Ar atmosphere in a glovebox. 14.8 mg $RhCl_3$ were dispersed in 8.2 ml of THF and stirred for 24 h at room temperature. The precursor dissolved completely in THF. 0.5 ml of freshly prepared $N(octyl)_4BEt_3H$/THF solution was then added, upon which the $RhCl_3$/THF mixture turned black immediately. The mixture was stirred for another 24 hours and after filtration (syringe filter 0.2 μm, Nylon) a homogeneous black colloidal solution was obtained.

Example 2—Preparation of a Solution of Carbon Composite Precursors and Subsequently of Polymer Initially 1.1 g of resorcinol and 300 mg of the pore template Pluronic F127 were dissolved in 4.5 mL of EtOH in a centrifuge tube until a clear solution was obtained. Then 4.5 mL of 3 M HCl were added and the tube was shaken for 30 minutes. Thereafter 1.2 ml of formaldehyde solution (37% in water) were added with continued shaking. Circa four minutes later the solution became turbid. Ten minutes after addition of formaldehyde a white precipitate was separated via centrifugation (7500 rpm, 10 min) and the remaining solution discarded. The white precipitate was washed with water and centrifuged again two times. The obtained polymer/template phase was subsequently freeze dried for 12 h to remove all volatile components, resulting in 855 mg of resin, which corresponds to ca. 32% of the employed components (resorcinol, formaldehyde, F127).

Example 3—Mixing of the Products of Example 1 and 2 and Further Treatment

For the RhNP/OMC film synthesis the freeze-dried polymer precursor was dissolved in 2 ml of THF under Ar atmosphere and shaken for 10 min. 8 ml of RhNP colloid in THF were added. The mixture was shaken for another 10 min. The resulting homogeneous black suspension was employed for film casting. Catalyst films were deposited via dip-coating at room temperature in Ar atmosphere inside a glove-box. The withdrawal speed was 300 mm/min. The coated substrates were transferred to a drying furnace and then treated for 12 h at 100° C. in air for film stabilization. The stabilized films were transferred into a tube furnace which was purged for 2 hours with $H_2$/Ar (4 vol % $H_2$). Afterwards the tube furnace was heated with 3 K/min in $H_2$/Ar flow to 700° C., holding this temperature for 3 h, and subsequent naturally cooled down to room temperature.

Example 4—Preparation of Colloidal Metal Nanoparticles (PtNP)

The reducing agent Tetraoctylammoniumtriethylhydroborate $(N(C_8H_{17})_4BH(C_2H_5)_3)$ was synthesized under Ar atmosphere ($O_2$<1 ppm; $H_2O$<1 ppm) in a glovebox. 549 mg of TOAB was initially dissolved in 1.2 ml THF. During stirring 1.0 ml of $KBEt_3H$ solution was added and a white precipitation formed. The mixture was stirred for 1 h and kept tightly sealed in a freezer (ca. 0° C.) for 20 hours. Thereafter the mixture was brought to room temperature in the glovebox and a white precipitate of KBr was removed by filtration (syringe filter, 5.0 μm, PTFE) and washed with 0.55 ml THF. The filtrate and washing solution was filtrated again (syringe filter, 0.2 μm, Nylon) and a colorless solution was obtained.

The PtNP colloid synthesis was performed under Ar atmosphere in a glovebox. 52.7 mg $PtCl_2$ were dispersed in 5 ml of THF and stirred for 24 h at room temperature. The precursor dissolved only partially and a brown precipitate remained visible. 1 ml of freshly prepared $N(octyl)_4BEt_3H$/THF was then added, upon which the $PtCl_2$/THF mixture turned black immediately. The mixture was stirred for another 24 hours during which nearly all precipitate was dissolved. After precipitate removal (filtration, syringe filter 0.2 μm, Nylon) a homogeneous black colloidal solution was obtained.

Example 5—Preparation of a Solution of Carbon Composite Precursors and Subsequently of Polymer Initially 1.1 g of resorcinol and 300 mg of the pore template Pluronic F127 were dissolved in 4.5 mL of EtOH in a centrifuge tube until a clear solution was obtained. Then 4.5 mL of 3 M HCl were added and the tube was shaken for 30 minutes. Thereafter 1.2 ml of formaldehyde solution (37% in water) were added with continued shaking. Circa four minutes later the solution became turbid. Ten minutes after addition of formaldehyde a white precipitate was separated via centrifugation (7500 rpm, 10 min) and the remaining solution discarded. The white precipitate was washed with water and centrifuged again two times. The obtained polymer/template phase was subsequently freeze dried for 12 h to remove all volatile components, resulting in 836 mg of resin, which corresponds to ca. 31% of the employed components (resorcinol, formaldehyde, F127).

Example 6—Mixing of the Products of Example 4 and 5 and Further Treatment

For the PtNP/OMC film synthesis the freeze-dried polymer precursor was dissolved in 3.3 ml of THF under Ar atmosphere and shaken for 10 min. 1.7 ml of PtNP colloid in THF were added. The mixture was shaken for another 10 min. The resulting homogeneous black suspension was employed for film casting. Catalyst films were deposited via dip-coating at room temperature in Ar atmosphere inside a glove-box. The withdrawal speed was varied (60, 150, 300 mm/min) to obtain films of different thicknesses. The coated substrates were transferred to a drying furnace and then treated for 12 h at 100° C. in air for film stabilization. The stabilized films were transferred into a tube furnace and heated with 3 K/min in $H_2$/Ar (4 vol % $H_2$) flow to 700° C., holding this temperature for 3 h, and subsequent naturally cooling down to room temperature.

Example 7—Analysis of Resultant Mesoporous Carbon Composite Material

Experimental

SEM images were collected on a JEOL 7401F at 10 kV. Image J program, version 1.39u (http://rsbweb.nih.gov/ij), was employed to determine pore diameters, film thicknesses, sizes of nanoparticles and to obtain fast Fourier transformations (FFT) of images. TEM images were recorded on a FEI Tecnai $G^2$ 20 S-TWIN operated at 200 kV. Colloidal PtNP or fragments of scraped off film segments were deposited on carbon-coated copper grids.

SAXS analysis of MeNP/OMC films was measured at BESSY mySpot beamline with 12.518 keV and sample-to-detector distance of 753.671 mm. A marCCD detector with 3072×3072 px was employed.

The electrical conductivity of PtNP/OMC coatings on $SiO_2$ substrates was measured with a Keithley Model 6517B Electrometer employing an 8×8 pin probe head with an alternating polarity sequence of the pins.

The pore system of PtNP/OMC was analyzed via $N_2$ physisorption isotherms recorded at 77 K on powder samples using a Quantachrome Autosorb-iQ. The samples were degassed in vacuum at 150° C. for 2 h prior to physisorption analysis. The surface area and pore size was evaluated with a NLDFT equilibrium Kernel and a model assuming cylindrical pores. The surface area of MeNP/OMC films coated on both sides of double side polished Si wafers was measured with Kr physisorption at 77 K using an Autosorb-iQ (Quantachrome). Prior to adsorption measurement the samples were degassed for 2 h at 150° C. in vacuum. The surface area was calculated via the Brunauer-Emmett-Teller (BET) method.

The microscopy analysis results are shown in FIGS. 3-5, the $N_2$ physisorption results are shown in FIG. 6, the SAXS analysis is shown in FIG. 7, and the catalytic activity is exemplarily shown in FIG. 8. Moreover, the BET surface areas and conductivity values measured for some composite materials according to the present invention are shown in the following table:

| BET surface areas and conductivity values of MeNP/OMC materials | | | | |
|---|---|---|---|---|
| MeNP/OMC film | BET $m^2/m^2$ | BET $m^2/g$ | BET $m^2/cm^3$ | conductivity S/cm |
| $Ru_{0.5}Pt_1NP$ | 31 | 135 | 154 | 7.3 |
| $Ru_1Pt_1NP$ | 177 | 794 | 822 | 3.44 |
| $Ru_3Pt_1NP$ | 190 | 802 | 1058 | 12.26 |
| $Ru_5Pt_1NP$ | 273 | 1349 | 1818 | 12.05 |
| RhNP | 196 | 474 | 818 | 9.33 |
| PdNP | 190 | 386 | 998 | 1.629E−05 |
| RuRhNP | 338 | 1056 | 492 | 3.13 |
| PtNP | 483 | 925 | 976 | 4.46 |

In this table, the mass of film per area (mass depth) was calculated using the STRATAGem film analysis software (v 4.3) based on wavelength dispersive X-ray (WDX) spectra analyzed with a JEOL JXA-8530F electron microprobe at 7 and at 10 kV. The mass depth of each element can be determined individually.

The BET surface area per geometric surface ($m^2/m^2$) can be simply derived as a quotient of both surface areas from physisorption measurements of MeNP/OMC films. The BET surface area per film volume ($m^2/cm^3$) can be derived from the said BET surface area per geometric surface ($m^2/m^2$) by dividing the value by the film thickness determined from cross-section SEM measurements. The specific BET surface area per mass ($m^2/g$) can be derived from the said BET surface area per geometric surface ($m^2/m^2$) by dividing the value by the the mass depth derived from WDX/StrataGem evaluation.

Example 8 Influence of the Metal Precursor on Structure and Activity

Characteristics of Pt containing OMC films prepared by two synthesis routes were compared:

Route 1 (ionic metal precursors) relies on the co-deposition of a polymeric carbon precursor and a structure-directing agent together with dissolved metal ions. Films synthesized via route 1 are denoted as Me/OMC. Route 2 (which is the method according to the invention, colloidal metal precursors) employs preformed colloidal metallic nanoparticles which are deposited together with a polymeric carbon precursor and a structure-directing agent. Films synthesized via route 2 are abbreviated by MeNP/OMC.

The films of both routes possess comparably high weight loadings in order to study the influence of the metal precursor species on film and pore morphology as well as the influence on nanoparticle size and crystallinity. Moreover, the performance in the electrocatalytic HER is compared.

8.1 Pore Morphology

The pore morphologies of a metal-free OMC, a Pt/OMC and a PtNP/OMC film are studied in FIG. 9 by cross-section SEM analyzes (FIG. 9a) and SAXS (FIG. 9b). All films were synthesized with F127 as structure directing agent. The OMC film was carbonized at 800° C. in $N_2$, Pt/OMC at 700° C. in $N_2$ and PtNP/OMC at 700° C. in $H_2$/Ar. Pt/OMC has a weight loading of 2.9 wt $\%_{Pt}$ and PtNP/OMC of 2.3 wt $\%_{Pt}$, as determined by WDX/StrataGem evaluation at 10 keV.

Cross-section SEM (FIG. 9a) confirms that all films are homogeneous and completely penetrated by ordered mesopores. The pores of Pt/OMC via route 1 appear less ordered and less densely packed than the pores of OMC and PtNP/OMC via route 2. The FFTs of the cross-section SEM images (insets in FIG. 9a) of OMC and PtNP/OMC show spots which can be attributed to distinct pore lattice planes indicating ordered pore systems. The FFT of the SEM image of Pt/OMC shows an anisotropic ring confirming a locally ordered pore structure without a higher degree of pore ordering.

SAXS studied the pore structure of all films. Each pattern recorded in transmission with 90° (FIG. 9b) features at least two circular diffraction rings. The periodic distances of these most dominant reflections amount to 7.9 nm and 13.5 nm for OMC and 7.8 nm and 13.4 nm for PtNP/OMC, respectively. The distances attributed to these two reflections are circa 25% smaller than the distances observed for Pt/OMC (10.2 nm and 18.7 nm). The smaller periodic distances prove that OMC and PtNP/OMC possess a more densely packed pore system. In case of OMC and PtNP/OMC the ratios of the periodic distances of ($1\bar{1}2$) to ($1\bar{1}0$) equal $3^{1/2} \approx 1.7$. Accordingly, the diffraction rings can be assigned to the ($1\bar{1}0$) and the ($1\bar{1}2$) planes of a cubic pore lattice.[80] The diffraction pattern of Pt/OMC cannot be assigned to a cubic pore system which confirms the observation of SEM analyses that the pore system of Pt/OMC is less densely packed. Yet, the appearances of two distinct rings indicate a higher degree of ordering.

Since the OMC film as well as the PtNP/OMC in FIG. 9 show a high degree of pore ordering, neither the atmosphere nor the temperature during carbonization have a significant influence on the mesostructure. However, the development of a densely packed pore system of Pt/OMC films via route 1 is disturbed. Apparently, metal ions in a high concentration hinder the formation of an ordered mesophase.

PtNP/OMC films with comparably high metal loadings show a well-ordered structure and a mesopore packing as dense as metal-free OMC films. According to this, neither the comparatively large nanoparticles nor the ammonium-based stabilizing agent disturb the mesophase formation.

8.2 Particle Size, Particle Crystallinity and Degree of Graphitization

Particle size and crystallinity of nanoparticles in Pt/OMC (2.9 wt $\%_{Pt}$, via route 1) and PtNP/OMC (2.3 wt $\%_{Pt}$, via route 2) films are studied in FIG. 10 with TEM (FIG. 10a), HR-TEM (FIG. 10c) and XRD (FIG. 10d).

TEM micrographs of Pt/OMC and PtNP/OMC films confirm an abundant presence of templated mesopores (FIG. 10a). The pores of PtNP/OMC appear more ordered than the pores of Pt/OMC (compare to FIG. 9). Dark spots evidence well-distributed Pt nanoparticles. The average diameters of Pt nanoparticles in Pt/OMC amount to 3.3±1.2 nm. The average diameter is slightly larger than the particles in PtNP/OMC with 3.0±1.0 nm in diameter (FIG. 10b). The particle size distribution of Pt/OMC is broader than of PtNP/OMC. Large particles with a diameter higher than 5 nm are more numerous in the Pt/OMC sample.

Lattice fringes in HR-TEM (FIG. 10c) indicate a high crystallinity of the observed Pt nanoparticles. The spacing of the lattice planes amount to 2.3 Å for both systems. This distance fits with the (111) lattice plane of cubic Pt (04-0802, Fm$\bar{3}$m). The crystallinity and crystallite size was additionally evaluated with XRD (FIG. 10d). Both films show reflections at 40° and 46° which can be attributed to cubic Pt. Rietveld refinements give crystallite diameters of 4.5 nm for Pt/OMC and 3.0 nm for PtNP/OMC. The crystallite size of PtNP/OMC corresponds well to the particle size from TEM measurements (FIG. 10b). The crystallite diameter of Pt/OMC is larger than the average nanoparticle diameter determined by TEM which is indicative for larger Pt particles which were also observed by TEM.

The reason that larger particles (>5 nm in diameter) are more numerous in highly-loaded Pt/OMC than PtNP/OMC films can be attributed to the formation mechanism of the nanoparticles. Pt nanoparticles in Pt/OMC films via route 1 are detectable by TEM at carbonization temperatures higher than 600° C. At elevated temperatures Pt atoms and small Pt clusters are moving inside the mesoporous carbon network to form nanoparticles. When the process of nanoparticle formation is finished at temperatures around 700° C., the particles are confined inside the mesopores and do not grow larger. The average particle diameters of the confined Pt nanoparticles amount to ca. 3.5 nm for all studied Pt/OMC films which were carbonized at 700° C. independent of the loading. As known from literature, thermal reduction of nanoparticles at high temperatures usually leads to a high polydispersity (Ortega-Amaya et al., 2015). In case of OMC films the mesoporous structure suppresses the formation of even larger nanoparticles (Galeano et al., 2012). It is possible that also smaller Pt clusters form during thermal reduction of Pt/OMC films. These smaller particles (<1 nm in diameter) are not detectable by TEM analysis. A part of these small Pt clusters might be trapped inside micropores or pore walls and thus is not available for the HER.

Preformed nanoparticles which are introduced into the film synthesis via route 2, according to the invention, undergo a different process during carbonization. The particle diameter of the colloidal particles amounts to 2.1 nm. During carbonization some Pt species are moving inside the carbon network. Sinter processes at elevated temperatures lead to slightly larger particles (3.0 nm) and a higher polydispersity. Nevertheless, the final particle diameter of Pt in PtNP/OMC is lower than in Pt/OMC since the mobility is lower and the degree of pore confinement effect most likely more pronounced for large preformed nanoparticles.

The degree of graphitization of the carbon film can be described by the XRD reflection at $2\theta=24°$ which can be assigned to stacking of graphene. FIG. 10d shows that the reflection at 24° is more pronounced for PtNP/OMC than for Pt/OMC. The electrical conductivity also corresponds to the graphitization of the film. The conductivity of PtNP/OMC (30.4 S/cm) is four times higher than the conductivity of Pt/OMC (8.3 S/cm). Both observations indicate that PtNP/OMC has a higher degree of graphitization.

In conclusion, synthesis route 2 leads to a more defined film morphology for Pt-containing OMC films at higher Pt weight loadings than route 1. The templated mesopores of PtNP/OMC are densely packed and more ordered than the mesopores of Pt/OMC. Both synthesis routes lead to crystalline particles. However, the Pt nanoparticles in PtNP/OMC are smaller. Moreover, the degree of graphitization in the PtNP/OMC sample is higher, making the film more electrically conductive. The ionic precursor in route 1 disturbs interactions of carbon precursors and template micelles during film synthesis leading to a lower degree of graphitization. Whereas, preformed nanoparticles apparently have a less pronounced impact.

8.3 HER Performance

The electrocatalytic performances of Pt/OMC catalyst films prepared via route 1 and a PtNP/OMC via route 2 were studied in a RDE setup with 0.5 M sulfuric acid using repeated potential cycles. Both catalysts exhibit similar weight loadings (Pt/OMC: 2.9 wt $\%_{Pt}$, PtNP/OMC: 2.3 wt $\%_{Pt}$). FIG. 11a depicts the $2^{nd}$ recorded cycle of a Pt/OMC catalyst with a geometric loading of 1.2 $\mu g_{Pt}/cm^2$ and a PtNP/OMC catalyst with 1.1 $\mu g_{Pt}/cm^2$.

The film thickness and thus geometric Pt loading was adjusted by changing the withdrawal speed during the dip-coating procedure. FIG. 11 plots the current density at −75 mV vs. RHE as a function of Pt loading during the $2^{nd}$ cycle (b) and the $50^{th}$ cycle (c), respectively. Each point in the diagram represents one measured catalyst film.

Both types of catalysts are active in the HER, but the difference in structural properties like pore ordering, conductivity as well as nanoparticle size and accessibility influence the activity (compare FIG. 11a). At current densities higher than −10 mA/cm² PtNP/OMC clearly outperforms Pt/OMC. FIGS. 11b and c show that the observed HER current scales (within the margin of error) linearly with the geometric loading for both types of catalyst. PtNP/OMC catalysts need 2-4 times less Pt to reach the same current density in the fresh (2nd cycle, FIG. 11b) as well as in the used state (50$^{th}$ cycle, FIG. 11c).

The enhanced activity of PtNP/OMC in the HER could be explained by improved transport properties and a better utilization of Pt inside the catalyst film. Pore morphology and particle size of PtNP/OMC help to explain this behavior. The pore morphology has an influence on transport properties. The mesopores in PtNP/OMC are ordered and more densely packed than in Pt/OMC which leads to a better interconnectivity of the pore system resulting in improved transport of electrolyte and $H_2$ molecules. PtNP/OMC films show a higher degree of graphitization which results in lower ohmic resistance and thus reduced transport limitations of electrons. The average diameter of Pt nanoparticles in PtNP/OMC is smaller than in Pt/OMC. The particles in PtNP/OMC show fewer large Pt particles after carbonization. Moreover, the synthesis route prevents the formation of small Pt particles, which could be trapped inside micropores or pore walls. These effects lead to more accessible active surface area in Pt/OMC films for the HER.

In summary, pore ordering, electrical conductivity as well as nanoparticle size and accessibility contribute to the HER activity of the discussed catalysts. It is, however, not possible to distinguish which property contributes most to the enhanced performance of PtNP/OMC in comparison to Pt/OMC.

8.4 Tafel Evaluation of Pt-Containing Carbon Catalyst Films

Mechanistic aspects of the HER can be studied by Tafel evaluation of current-voltage curves. The potential E is plotted versus the logarithm of the current density j. The Tafel slope b indicates the rate-determining step of the HER. Values of 40 mV/dec refer to electrochemical formation of molecular $H_2$ (Heyrovsky reaction, $MeH_{ads}+H^++e^- \rightleftharpoons Me+H_2$), whereas values of 30 mV/dec are attributed to rate limitations by chemical $H_2$ desorption via recombination of adsorbed H atoms (Tafel reaction, $2\ MeH_{ads} \rightleftharpoons 2\ Me+H_2$).

FIG. 12 compares the Tafel slopes of Pt/OMC via route 1, PtNP/OMC via route 2 and a commercial Pt/Vulcan catalyst prepared with Nafion via an ink-casting procedure. All films have a geometric Pt loading of ca. 1 $\mu g_{Pt}/cm^2$. The Tafel plots of the $2^{nd}$ cycle of cyclic voltammetric testing in the HER regime is shown in FIG. 12a.

The Tafel slopes b during the cathodic sweep of the $2^{nd}$ cycle (FIG. 12a) amount to 37 mV/dec (Pt/OMC), 32 mV/dec (PtNP/OMC) and 28 mV/dec (Pt/Vulcan/Nafion). Accordingly, the rate-determining step of Pt/OMC can be attributed to the Heyrovsky reaction mechanism. PtNP/OMC and Pt/Vulcan/Nafion show a Tafel slope consistent with a Volmer-Tafel mechanism. PtNP/OMC shows a linear Tafel behaviour in a broader current density regime than Pt/OMC and Pt/Vulcan/Nafion.

The regimes in which Pt/OMC and Pt/Vulcan/Nafion follow the Tafel equation range up to current densities of 6 mA/cm² ($10^{0.75}$ mA/cm²) and 4 mA/cm² ($10^{0.6}$ mA/cm²), respectively. In contrast, PtNP/OMC shows a larger regime of linear correlation which ranges from 1 mA/cm² ($10^0$ mA/cm²) to ca. 30 mA/cm² ($10^{1.5}$ mA/cm²). Consequently, the HER activity of PtNP/OMC is not as restricted by transport limitations as Pt/OMC and Pt/Vulcan/Nafion in the regime of current densities up to 30 mA/cm².

FIG. 12b compares the current responses during the $100^{th}$ cycle of CV measurements between 50 and 1200 mV of a PtNP/OMC, a Pt/OMC, a Pt/Vulcan/Nafion and a Pt-free OMC film.

In conclusion, all Pt-based catalysts show a similar behaviour in the Tafel regime. During the $2^{nd}$ HER cycle PtNP/OMC seems to be less restricted by transport limitations than Pt/OMC and Pt/Vulcan/Nafion at current densities between 10 mA/cm² and 30 mA/cm². Furthermore, Pt/Vulcan/Nafion deviates stronger from the linear behaviour at low current densities compared to the regime at higher currents densities than the OMC-based catalysts. As shown above, PtNP/OMC catalysts have a higher mesopore ordering, a more densely packed pore system, show a higher degree of graphitization and a higher electrical conductivity. Small nanoparticles are well-dispersed throughout the film volume. The particles are not trapped in micropores or pore walls. These properties most likely decrease transport limitations of electrolyte, $H_2$ or electrons.

The features of the present invention disclosed in the specification, the claims and/or in the accompanying drawings may, both separately and in any combination thereof be material for realizing the invention in various forms thereof. Further modifications of the preferred embodiments are possible without leaving the scope of the invention which is solely defined by the claims.

REFERENCES

Bernsmeier D, Chuenchom L, Paul B, Rümmler S, Smarsly B, and Ralph Kraehnert R. Highly Active Binder-Free Catalytic Coatings for Heterogeneous Catalysis and Electrocatalysis: Pd on Mesoporous Carbon and Its Application in Butadiene Hydrogenation and Hydrogen Evolution. *ACS Catalysis* 2016, 6, 8255-8263.

Galeano, C.; Meier, J. C.; Peinecke, V.; Bongard, H.; Katsounaros, I.; Topalov, A. A.; Lu, A.; Mayrhofer, K. J. J.; Schüth, F., Toward Highly Stable Electrocatalysts via Nanoparticle Pore Confinement. *Journal of the American Chemical Society* 2012, 50, 20457-20465.

Ortega-Amaya, R.; Matsumoto, Y.; Pérez-Guzmán, M. A.; Ortega-López, M., In situ synthesis of Cu2O and Cu nanoparticles during the thermal reduction of copper foil-supported graphene oxide. *Journal of Nanoparticle Research* 2015, 10, 1-8.

The invention claimed is:

1. A method of preparing a mesoporous carbon composite material comprising a mesoporous carbon phase and preformed metal nanoparticles located within the mesoporous carbon phase, the method comprising the steps:
   a) providing a solution of carbon composite precursors, the solution of carbon composite precursors comprising a structure directing agent capable of forming micelles or lamellar structures, one or several poylmerizable carbon precursor components and a first solvent;
   b) inducing the solution of carbon composite precursors to polymerize to form a dispersion of polymer in the first solvent, and separating the polymer from the first solvent;
   c) providing preformed stabilized metal nanoparticles;
   d) mixing the polymer and the preformed stabilized metal nanoparticles, wherein during the mixing, either the polymer or the preformed stabilized metal nanoparticles or both are dispersed in a second solvent;
   e) stabilizing the mixture of step d) by subjecting it to a stabilization heat treatment in the range of from 80° C. to 120° C.; and
   f) subjecting the product of step e) to a carbonization heat treatment in the range of from 500° C. to 1000° C.

2. The method according to claim 1, wherein the method additionally comprises a step:
   drying the mixture resulting from step d) to yield a solid, which step is performed between steps d) and e).

3. The method according to claim 1, wherein the structure directing agent capable of forming micelles or lamellar structures is a surfactant selected from the group consisting of nonionic surfactants, cationic surfactants, anionic surfactants or zwitterionic surfactants ore mixtures thereof.

4. The method according to claim 3, wherein the surfactant, is a nonionic surfactant, which is a block copolymer.

5. The method according to claim 4 wherein the block copolymer is a poloxamer.

6. The method according to claim 1, wherein the polymerizable carbon precursor components comprise at least one phenolic compound and, optionally, at least one crosslinkable aldehyde compound, wherein the at least one crosslinkable aldehyde compound is added to the solution during step a) or at the beginning of step b).

7. The method according to claim 6, wherein the at least one phenolic compound is selected from the group consisting of phenol, catechol, resorcinol, dihydroquinone, phloroglucinol, cresol, halophenol, aminophenol, hydroxybenzoic acid, and dihydroxybiphenyl.

8. The method according to claim 6, wherein the at least one crosslinkable aldehyde compound is selected from the group consisting of formaldehyde, organoaldehydes, and organodialdehydes, represented by formulae HCHO, R—CHO and OHC—R—CHO, respectively, wherein R is a bond, a straight-chained, branched or cyclic hydrocarbonyl group, which can be either saturated or unsaturated, typically containing at least 1, 2, or 3 carbon atoms and up to 4, 5, 6, 7, 8, 9, or 10 carbon atoms.

9. The method according to claim 6, wherein the at least one crosslinkable aldehyde compound is formaldehyde.

10. The method according to claim 1, wherein the preformed metal nanoparticles are nanoparticles of one or more metals selected from the group consisting of Sn, Cu, Ag, Au, Zn, Cd, Hg, Cr, Mn, Re, Fe, Ru, Os, Co, Rh, Ir, Ni, Pd, Pt.

11. The method according to claim 10, wherein the preformed metal nanoparticles are nanoparticles of one or more metals selected from the group consisting of Pt, Pd, Ru, Rh, Ir, Os and Ru.

12. The method according to claim 10, wherein the preformed metal nanoparticles are nanoparticles of one or more metals selected from the group consisting of Pd, Ru, Rh and Ir.

13. The method according to claim 1, wherein the preformed stabilized metal nanoparticles do not include carbon nanoparticles, wherein said carbon nanoparticles are carbon blacks, carbon onions, fullerenes, carbon nanodiamonds and carbon nanobuds.

14. The method according to claim 1, wherein the preformed stabilized metal nanoparticles have a metallic core of one or several metals selected from the group consisting of Sn, Cu, Ag, Au, Zn, Cd, Hg, Cr, Mn, Re, Fe, Ru, Os, Co, Rh, Ir, Ni, Pd, Pt stabilized by a quaternary ammonium cation or another ionic stabilizing agent.

15. A method of preparing a mesoporous carbon composite material comprising a mesoporous carbon phase and preformed metal nanoparticles located within the mesoporous carbon phase, the method comprising the steps:
   a) providing a solution of carbon composite precursors, the solution of carbon composite precursors comprising a structure directing agent capable of forming micelles or lamellar structures, one or several poylmerizable carbon precursor components and a first solvent;
   b) inducing the solution of carbon composite precursors to polymerize to form a dispersion of polymer in the first solvent, and separating the polymer from the first solvent;
   c) providing preformed stabilized metal nanoparticles;
   d) mixing the polymer and the preformed stabilized metal nanoparticles, wherein during the mixing, either the polymer or the preformed stabilized metal nanoparticles or both are dispersed in a second solvent;
   e) stabilizing the mixture of step d) by subjecting it to a stabilization heat treatment in the range of from 80° C. to 120° C.;
   f) subjecting the product of step e) to a carbonization heat treatment in the range of from 500° C. to 1000° C.; and
   g) applying the mixture resulting from step d) to a substrate to form a polymer film having micelles or lamellar structures and metal nanoparticles within, which step is performed between steps d) and e).

* * * * *